US006628857B1

(12) United States Patent
Bonadeo et al.

(10) Patent No.: US 6,628,857 B1
(45) Date of Patent: Sep. 30, 2003

(54) OPTICAL SWITCH WITH AN ARRAY OF OFFSET ANGLED MICRO-MIRRORS

(75) Inventors: Nicolas H. Bonadeo, Aberdeen, NJ (US); Igal Brener, Westfield, NJ (US)

(73) Assignee: Tellium, Inc., Oceanport, NJ (US)

( * ) Notice: Subject to any disclaimer, the term of this patent is extended or adjusted under 35 U.S.C. 154(b) by 259 days.

(21) Appl. No.: 09/757,475

(22) Filed: Jan. 11, 2001

(51) Int. Cl.⁷ ................................................. G02B 6/35
(52) U.S. Cl. ........................................................ 385/18
(58) Field of Search .......................... 385/16–18, 20–22

(56) References Cited

U.S. PATENT DOCUMENTS

| | | | | |
|---|---|---|---|---|
| 6,374,007 B1 | * | 4/2002 | Hagelin et al. | 385/17 |
| 6,411,751 B1 | * | 6/2002 | Giles et al. | 385/16 |
| 6,466,711 B1 | * | 10/2002 | Laor et al. | 385/18 |
| 6,483,962 B1 | * | 11/2002 | Novotny | 385/18 |
| 2002/0164112 A1 | * | 11/2002 | Sugitatsu et al. | 385/18 |

* cited by examiner

Primary Examiner—John D. Lee
Assistant Examiner—Sarah U Song
(74) Attorney, Agent, or Firm—Jeffery J. Brosemer

(57) ABSTRACT

An optical network element uses steerable mirrors in an optical switch to couple optical inputs and optical outputs. An optical switch has at least one array of the steerable mirrors, which can be oriented so as to reflect an optical signal between an input and an output. A shorter optical path between the input and the output reduces optical losses because optical losses in an optical switch using mirrors are directly proportional to the total length of the optical path. Reducing the optical path depends upon the switching tilt angle used in steering the mirrors. But tilting the micromirrors near their critical tilt angle or repeatedly across large tilt angles will degrade reliability or control. However, the total optical path can be shortened and the reliability of steerable mirrors can be maintained or increased if at least some of the micro-mirrors in an array are offset angled.

10 Claims, 26 Drawing Sheets

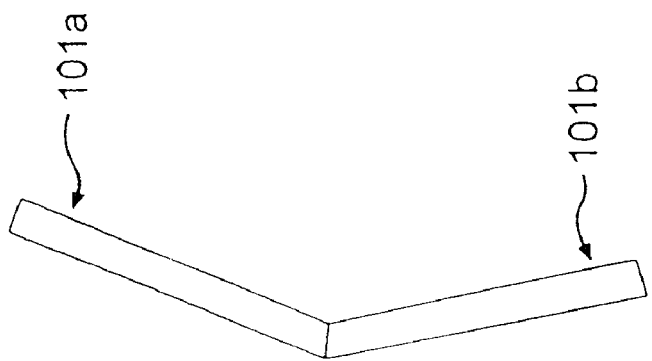

OPTICAL SWITCH WITH AN ARRAY OF OFFSET ANGLED MICRO-MIRRORS

BACKGROUND OF THE INVENTION

1. Field of the Invention

The present invention relates to an optical fiber based communications network, and more particularly to an optical switch arrangement that provides reduced optical losses and reliable switching.

2. Discussion of the Related Art

In recent years, Internet usage and other computer communications modes have become widespread. Moreover, audio and video applications that are becoming increasingly popular require large amounts of information (bandwidth) to be transferred. As a result, demands on the bandwidth supported by communications systems have skyrocketed. Optical communication systems have become increasingly important to fulfill such needs.

Such optical communications systems are capable of rapidly transferring large volumes of information by converting electrical signals into light signals and transmitting the light through optical fibers. The optical fibers form a network of optical paths between different geographic locations (e.g., different metropolitan areas). To route the information between the different locations, the information is switched between different optical paths. Conventionally, the information is switched by converting the optical signals into electrical signals, switching the electrical signals, reconverting the electrical signals to optical signals and re-transmitting the optical signals onto the desired optical path.

With advances in optical communications technology, optical switches (such as micro-mirror switches) are being developed to provide large switching fabrics that operate in the optical domain and can switch more information faster than electrical switches. A common problem of micro-mirror switches, as well as other optical switches, is achieving efficient coupling between the inputted and outputted optical signals with the switch fabric.

Input and output coupling may be achieved by aligning an optical fiber and a collimating lens at both the inputs and the outputs to be focused on an array or arrays of mirrors. For example, large port count cross-connect micro-mirror switches might have a considerable optical path between a given input and output (more than 10 cm but in most cases less than 50 cm). In order to reduce losses between inputs and outputs, the optical path between inputs and outputs should be reduced to maintain sufficiently narrow beam widths for the optical widths of all the optical elements. However, as the distance between inputs and outputs decreases, the range of angles over which the micro-mirrors have to move in order to switch inputs to outputs increases. Micro-mirrors typically should not be repeatedly tilted to or near an angle that causes damage to the micro-mirrors or switching reliability may suffer.

Moreover, applications involving long distance optical paths at high bit rates (>Gbs) require the use of optical fibers requiring having tight fabrication tolerances to avoid optical loss if strict angular tolerances (within 0.01 degrees) are not achieved. In addition, such optical fibers have a small core diameter and a small numerical aperture. The small numerical aperture implies that the cone of light that can be accepted by the optical fiber is narrow. Hence, for reasons such as these, through-put is easily decreased if the light is not properly focused or if the light is diminished in intensity, thereby potentially causing signal loss or signal deterioration.

To successfully operate optical switches using mirrors, the mirrors must be precisely aligned and the distance between mirrors reflecting a beam to connect optical links should be minimized. If the angular position of the mirrors are off and/or if the mirrors are too far apart, some or all of the light from the input will not reach the selected output. There remains a need in the art for an optical switch having a compact and reliable arrangement of steerable mirrors.

SUMMARY OF THE INVENTION

Accordingly, the present invention is directed to an optical switch that substantially obviates one or more of the problems due to limitations and disadvantages of the related art.

An objective of the present invention is to provide precise optical switching having reliable angular responsiveness by minimizing a mirror's range of movement near a critical tilt angle of the mirror.

Another objective of the present invention is to maintain precision optical switching by preventing a mirror from tilting to an angle that is near the mirror's critical tilt angle.

Another objective of the present invention is to reduce optical losses by shortening the distance between the inputs and the outputs of an optical switch.

Another objective of the present invention is to provide both reliable and precise control in optical switching using mirrors.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optically switched network element comprises a plurality of optical inputs; a plurality of optical outputs; an optical switching mechanism for selectively coupling input optical signals from the plurality of optical inputs to said plurality of optical outputs, said optical switching mechanism including an array of at least two steerable mirrors, wherein at least one of the steerable mirrors has an offset angle.

In another aspect, a method of switching optical signals by inputting the received optical signals into an optical switch; switching the received optical signals within the optical switch using at least two mirror arrays; and outputting the received optical signals from the optical switch to output optical fibers, wherein at least one of the mirrors in the arrays having an offset angle greater than zero prior to inputting the received optical signals.

Another aspect is an optical switch having a plurality of inputs emitting input beams within an optical switch; a plurality of outputs receiving output beams emitted from the optical switch; and an optical switching mechanism for selectively coupling input beams from the plurality of inputs to the plurality of outputs as output beams, the optical switching mechanism comprising at least two arrays of steerable mirrors, wherein at least one of the steerable mirrors has an offset angle greater than zero degrees.

Another aspect is an optical switch having a plurality of optical inputs; a plurality of optical outputs; an optical switching mechanism for selectively coupling input optical signals from the plurality of optical inputs to the plurality of optical outputs, the optical switching mechanism including an array of at least two steerable mirrors on a substrate; and control electrodes on the substrate for steering the mirrors, and static DC potentials are applied to the control electrodes of a mirror and subsequent control signals for steering the mirror are superimposed on the static DC potential.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 16a and 16b illustrate exemplary ways of making arrays with segments.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
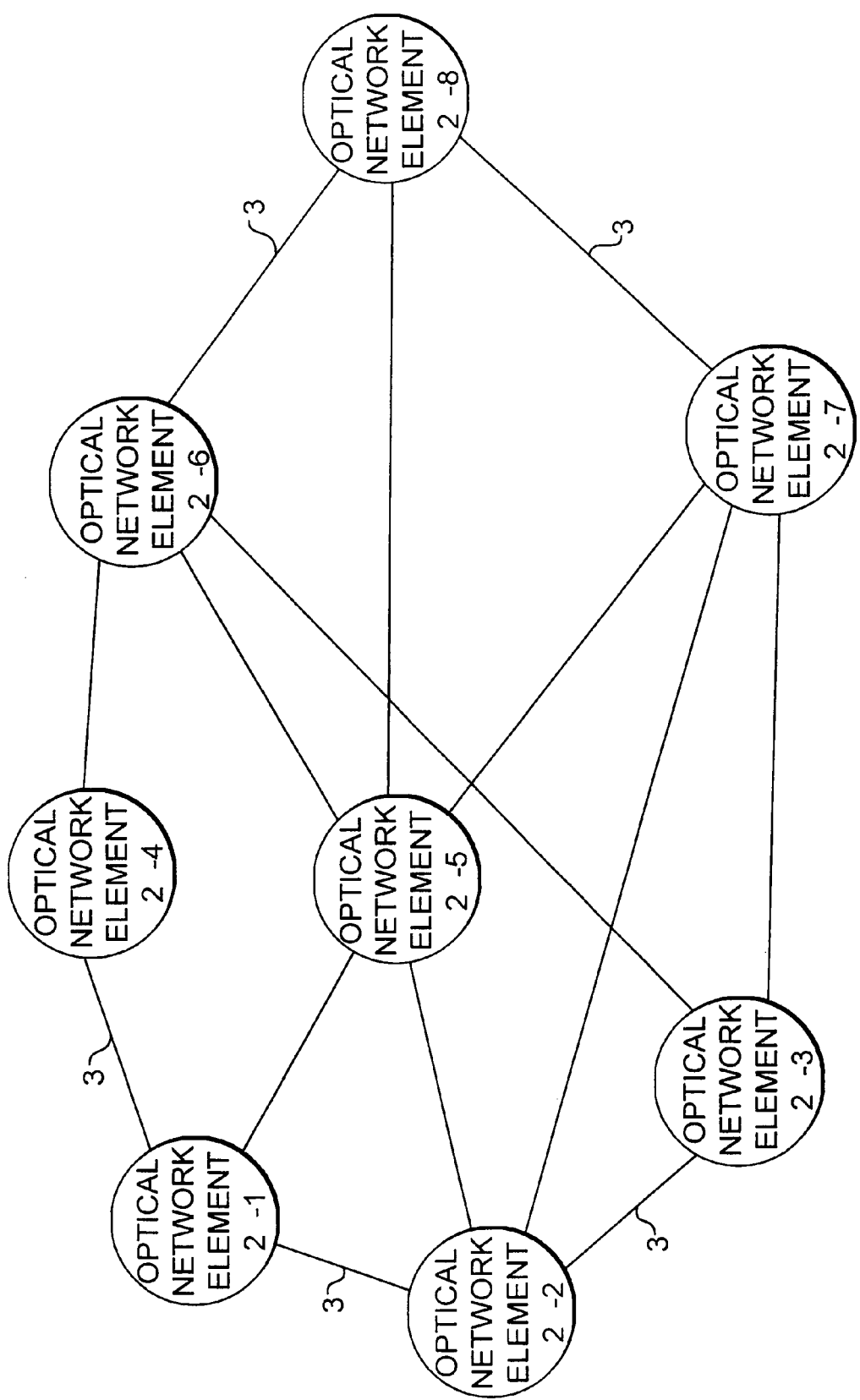
FIG. 1 illustrates an exemplary embodiment of an optical mesh communications network that includes the present invention.

The present invention is particularly useful in optical switches for optical telecommunications network systems that carry optical communications signals, such as wavelength division multiplexed (WDM) signals, over optical fibers. FIG. 1 illustrates an exemplary embodiment of an optical mesh communications network 1. While FIG. 1 illustrates an optical mesh network, the present invention may be used in connection with other optical network architectures, such as ring, chains, and stars, among others, as well as other optical applications. As shown, the network 1 is made up of optical network elements 2-1 to 2-8 interconnected through optical links 3 in a mesh pattern. Of course, the number of optical network elements 2 and interconnections shown in FIG. 1 is intended as an example only. It should be clear that the present invention is applicable with different numbers and/or interconnections of network elements 2. The optical links 3 are shown generally and may encompass different numbers of optical paths and different physical paths between the network elements 2.

In general, the optical network elements 2 communicate information signals to other optical network elements through the optical links 3. The optical network elements 2 may include optical cross-connects, add-drop multiplexers, or other switching equipment to allow the signals carried on the optical links 3 to be transmitted through the network elements 2, as necessary, from source to destination. In addition, and not shown in FIG. 1, the optical network elements 2 may be connected to information sources (ingresses) and destinations (egresses) in the locality of that optical network element 2. Thus, information signals may enter the optical mesh network 1 at a local connection to network element 2-2. The information signals may be converted to optical signals, if they are not already, and then travel in the optical network 1 from network element 2-2, through network elements 2-3 and 2-7, and to network element 2-8, where it is passed to a destination in the locality of network element 2-8.

Figure 2:
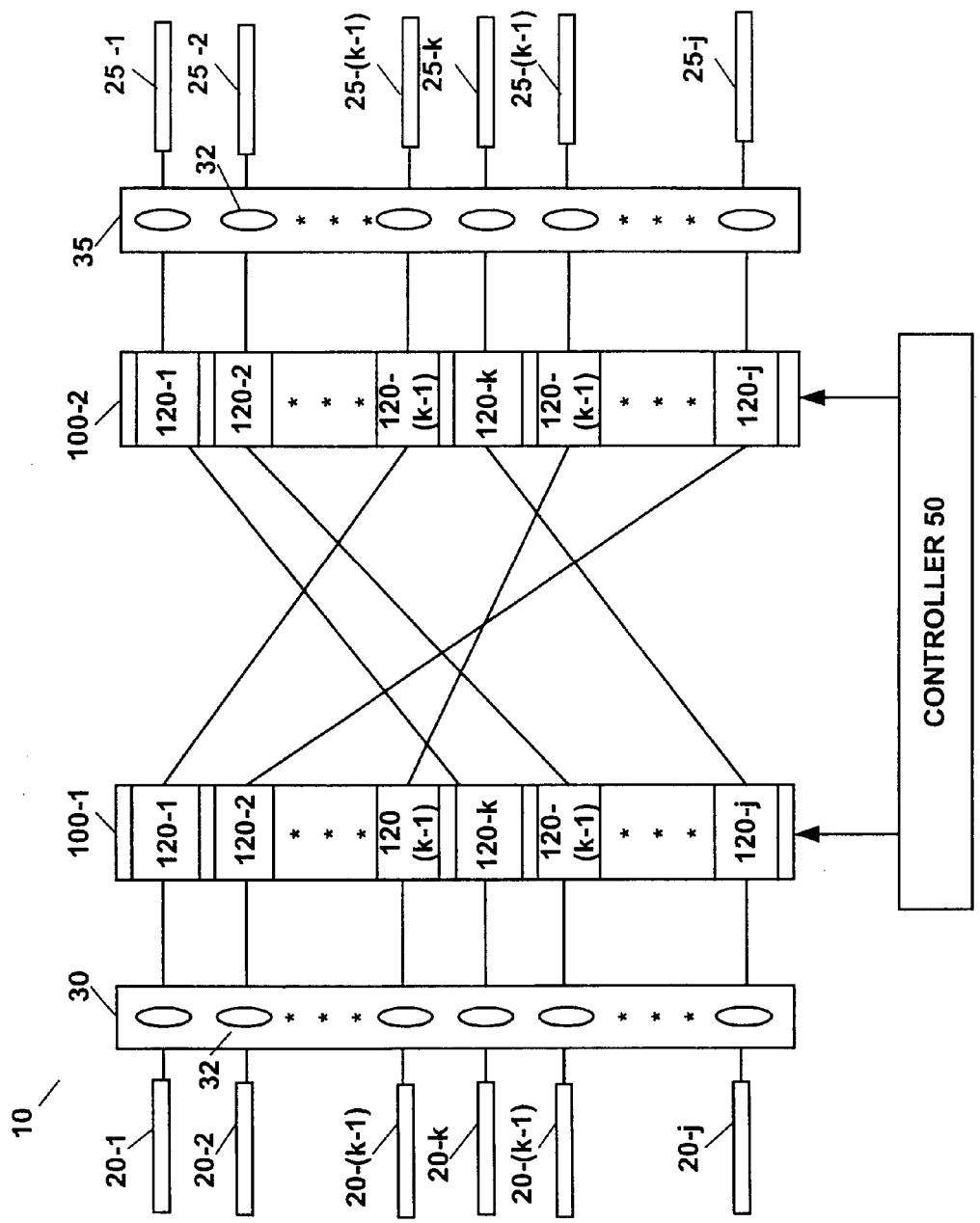
FIG. 2 provides a schematic of an optical switch design for using mirror arrays in accordance with the present invention.

FIG. 2 illustrates a schematic of an optical switch 10 that may be used in network elements. The optical switch 10 according to the present invention may be configured as an optical cross connect (OXC), an add-drop multiplexer (ADM), or another optical switch arrangement.

The optical switch 10 switches optical signals from a plurality of input optical fibers 20-1 to 20-j (collectively "input optical fibers 20") to selected output fibers 25-1 to 25-j (collectively "output optical fibers 25"). The input optical fibers 20 and output optical fibers 25 may be arranged in any way, for example a k x j/k rectangular array, such as a square array. The present invention is not limited by the types of optical signals carried by the input optical fibers 20 and output optical fibers 25. Each optical input fiber 20 may carry WDM signals, a single wavelength optical signal that was demultiplexed from a WDM signal by a wavelength division demultiplexer, or other types of optical signals, such as CATV signals. Similarly, each optical output fiber 25 may carry WDM signals, single wavelength optical signal to be multiplexed with other optical signals by a wavelength division multiplexer, or other types of optical signals. The optical signals typically carry information and may have wavelengths of about 1300–1500 nm, for example. While FIG. 2 shows a schematic of an embodiment with j input optical fibers 20 and j output optical fibers 25, the number of input optical fibers may differ from the number of output optical fibers. The input and output fibers might be single mode or multimode.

The input optical fibers 20 carry optical signals that are supplied, respectively, to a lens arrangement 30. The lens arrangement 30 may include a plurality of micro-lenses 32 arranged in an array. The micro-lenses 32 are preferably arranged so that each input optical fiber 20 is aligned with a micro-lens 32. Alternatively, microlenses 32 may be integrated with the ends of the input optical fibers 20. In this way, optical signals emitted from an input fiber 20 will pass through one of the micro-lenses 32. The micro-lenses 32 direct optical beams from the input optical fibers 20 to a first arrangement of mirrors 100-1, which will be described in greater detail below.

Although the preferred embodiments of the invention uses steerable micro-mirrors, objectives of the invention can be achieved using other types of mirrors and/or arrays of mirrors. The first mirror arrangement 100-1 includes a plurality of steerable micro-mirrors 122. The micro-mirrors 122 may be arranged in a planar array or nonplanar array. Each input optical fiber 30 corresponds to one micro-lens 32 of the first lens arrangement 30 and one micro-mirror 122 of the first micro-mirror arrangement 100-1. Using the micro-mirrors 122 and responsive to control signals, the first micro-mirror array 100-1 couples the optical beams from the lens array 30 to selected movable micro-mirrors 122 of a second array of micro-mirrors 100-2. The second micro-mirror array 100-2 includes micro-mirrors 122 that may be arranged on a planar or nonplanar substrate. The second micro-mirror array 100-2 need not match the first micro-mirror array 100-1 in terms of being a planar array, a nonplanar array, the number of mirrors, the shape of the mirrors or the size of the mirrors.

Each micro-mirror 122 of the first array 100-1 is preferably movable to permit an input beam to be reflected by the micro-mirror 122 to any micro-mirror 122 of the second array 100-2. The micro-mirrors 122 of the second array 100-2, also responsive to control signals, receives and couples the optical beams through a second lens array 35 to output fibers 25. The second lens array 35 includes micro-lenses 32, which may be arranged in an array, aligned with output optical fibers 25. Alternatively, microlenses 32 may be integrated with the ends of the output optical fibers 25. Micro-lenses 32 direct the optical beams into output optical fibers 25. Accordingly, optical signals carried on input optical fibers 20 may be selectively coupled to output optical fibers 25. The micro-mirror arrays 100-1 and 100-2 can be controlled to redirect or switch the coupling of optical signals. For example, as shown in FIG. 2, movable micro-mirror 122-1 of array 100-1 directs an optical signal to movable micro-mirror 122-(k+1280) of array 100-2. However, responsive to control signals, movable micro-mirror 122-1 of array 100-1 may redirect the optical signal it receives from input optical fiber 20-1 to movable micro-mirror 122-2 of array 100-2. Micro-mirror 122-2 may be controlled to receive the optical signal and provide it to optical fiber 25-2.

While FIG. 2 shows a dual stage switching arrangement, one or more additional stages of micro-mirror arrays may be interposed between micro-mirror arrays 100-1 and 100-2 to form a multi-stage switching arrangement. Furthermore, a micro-mirror switching arrangement may contain two or more micro-mirror arrays in which a micro-mirror array nearest an input can direct the input beam to one or more other micro-mirror arrays nearest an output. Such an arrangement can also be accomplished with a micro-mirror switching arrangement in which micro-mirror array(s) nearest the input are arranged on a nonplanar convex (or concave) substrate and the other micro-mirror arrays nearest an output are on a nonplanar concave (or convex) substrate.

Figure 3:
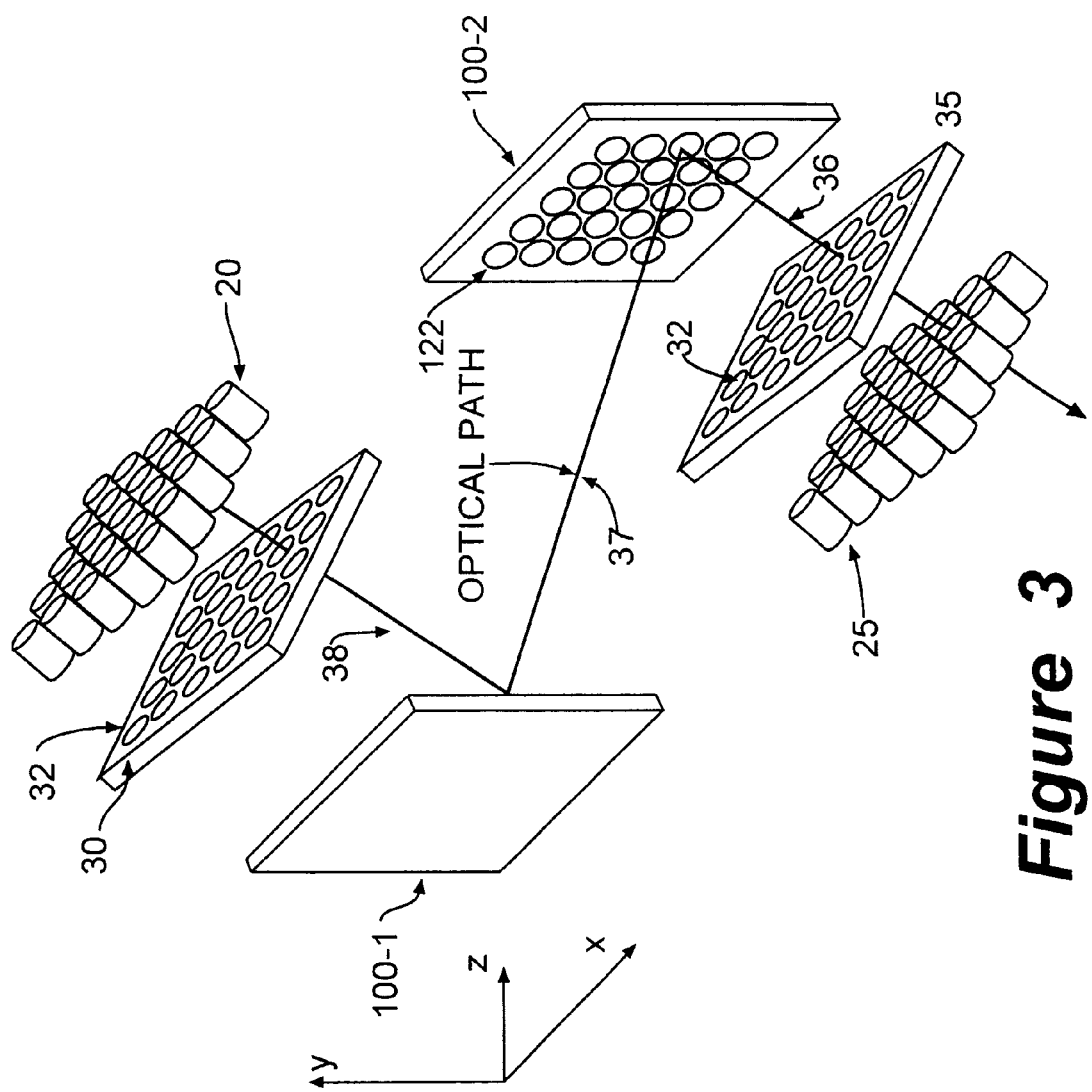
FIG. 3 illustrates an embodiment of an optical switch design for using mirror arrays in accordance with the present invention.

FIG. 3 shows an example of an optical switch 10 according to the schematic of FIG. 2. As shown in FIG. 2, the input optical fibers 20 and the output optical fibers 25 are arranged in two-dimensional arrays. Similarly, lens arrangements 30 and 35 include micro-lenses 32 arranged in arrays and aligned with the input optical fibers 20 and the output optical fibers 25, respectively. The micro-mirrors 122 of the first and second arrays 100-1, 100-2 are formed of microelectromechanical system (MEMS) elements. The first array 100-1 is positioned at an angle to lens array 30 and generally faces the second array 100-2 with a distance between the two arrays. The second array 100-2 is positioned at an angle to the second lens array 35. Accordingly, an optical path 36/37/38 from an input fiber to an output fiber traverses a generally "Z-shaped" optical path, as illustrated in FIG. 3. However, different optical path shapes may be implemented.

As shown in FIG. 3 with a single optical beam, the first lens array 30 receives the input optical beam from the input optical fibers 20 at a micro-lens 32 and directs the input beam to a movable micro-mirror 122 of the first array 100-1. Depending on the angular position of the movable micro-mirror 122, the input optical beam is reflected to a selected movable micro-mirror 122 of the second array 100-2. The movable micro-mirror 122 of the second array 100-2 reflects the input optical beam through a lens 32 of the second lens array 35 to a selected one of the output optical fibers 25. Thus, the optical beam passes out of the input optical fiber, passes through a lens 32 of the first lens array 30, is reflected by micro-mirrors in the first and second arrays 100-1, 100-2, passes through a lens 32 of the second lens array 30, and is directed into a selected output optical fiber 25.

Figure 4A:
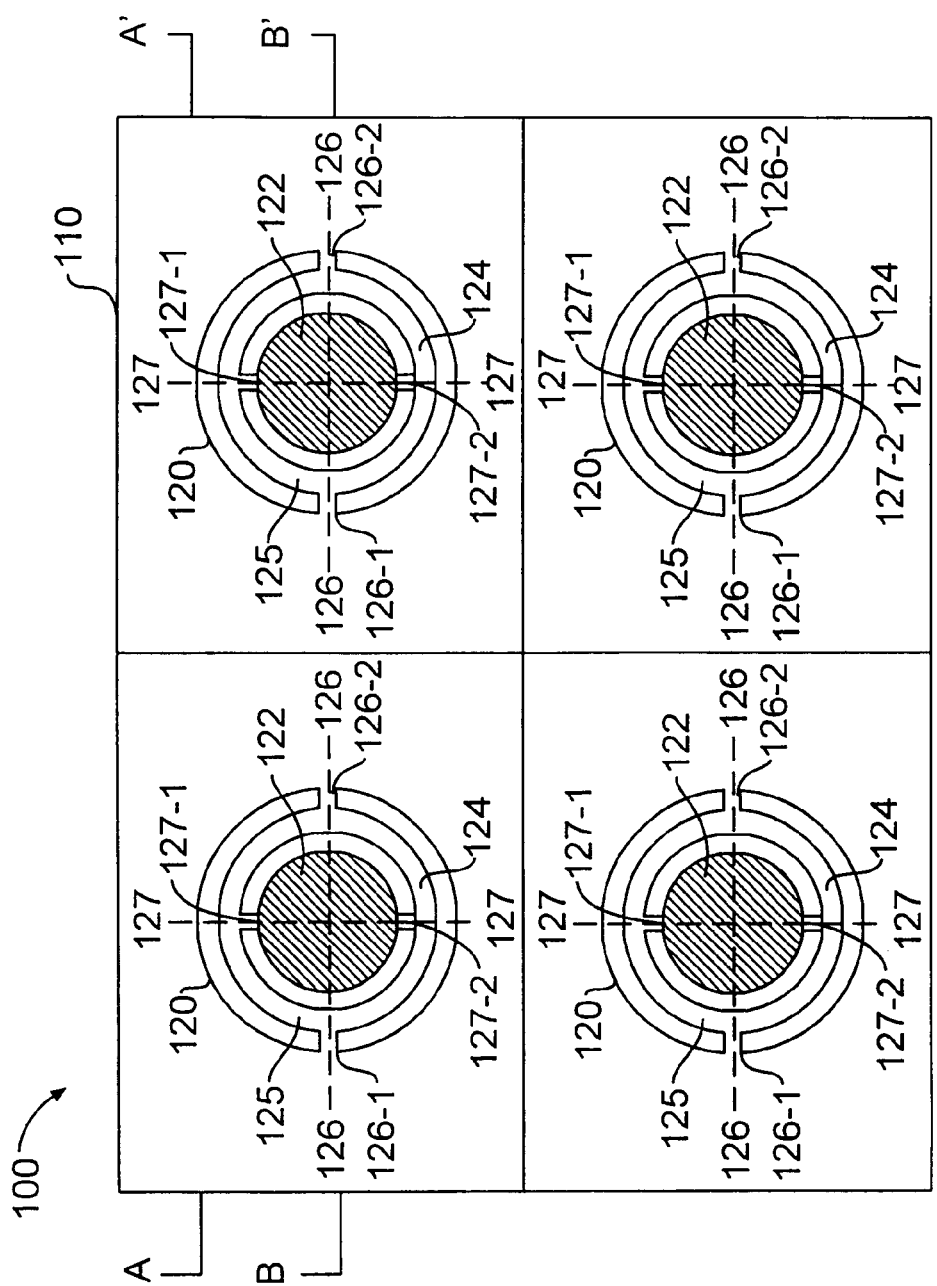
FIGS. 4a and 4b are respectively plan and cross-sectional views of a single gimbal microelectromechanical system ("MEMS") mirror.
Figure 4B:
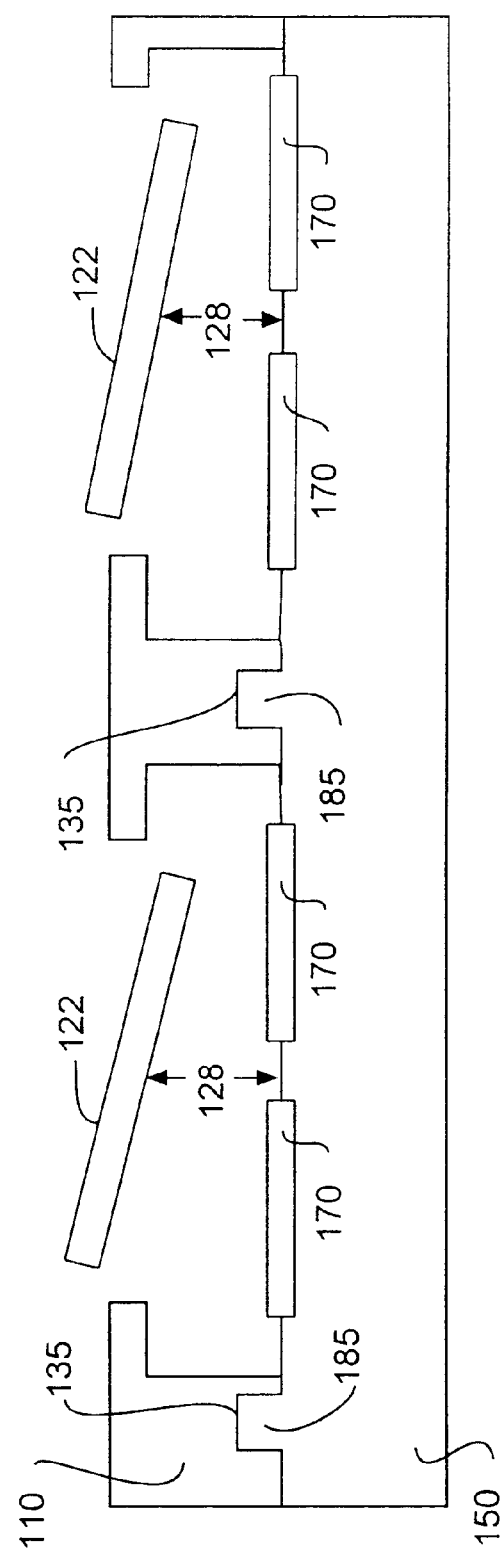

FIGS. 4a and 4b respectively illustrate plan and cross-sectional views of a portion of a an exemplary micro-mirror array 100. FIG. 4b represents a cross-section of the micro-mirror arrangement 100 of FIG. 4a taken along an axis B–B'. As should be apparent, FIGS. 4a and 4b provide simplified illustrations of micro-mirror arrangement 100 for purposes of explanation. Of course, other steerable micro-mirror or other mirror structures may be used consistent with the present invention.

The micro-mirror arrangement 100 may be formed using MEMS technology. The arrangement 100 includes a planar substrate 150, which may be formed, for example, of single crystalline silicon on which a plurality of micro-mirrors 122 are formed in an array. More particularly, the planar substrate 150 includes a plurality of micro-mirrors 122 and corresponding mirror mounts 124 for mounting the micro-mirrors 122. The micro-mirrors 122 may be formed with a gold coating, for example, to provide a reflective surface. Each micro-mirror 122 and corresponding mirror mount 124 form a movable micro-mirror unit 120. FIG. 4a shows four movable micro-mirror units 120 for purposes of illustration. Of course, the micro-mirror arrangement 100 may have more or fewer than four movable micro-mirror units 120.

In particular, the mirror mount 124 includes a mounting arm 125 coupled to the remainder of the planar substrate 110 by pivot arms 126-1, 126-2 and coupled to the micro-mirror 122 by pivot arms 127-1, 127-2. Pivot arms 126-1 and 126-2 enable the mounting arm 125, and thus the micro-mirror 122, to pivot with respect to the planar substrate 300 about a first axis 126. Pivot arms 127-1 and 127-2 enable the micro-mirror 122 to pivot with respect to the mounting arm 125 about a second axis 127, which is orthogonal to the first axis 126. The pivot arms can be silicon serpentine springs as well as other elastic devices. The pivoting action is caused by electrostatic or electromagnetic forces on the mirror 122 from electrodes on the substrate. As shown in FIG. 4a, each mirror mount 124 may be formed as a single gimbal in that two sets of pivot arms with first set being 126-1 and 126-2, and the second set being 127-1 and 127-2.

As shown in FIG. 4b, the substrate 150 includes a plurality of electrodes 170 arranged in groups corresponding to the movable micro-mirror assemblies 120 and, in particular, to the micro-mirror 122 and mounting arm 125 of the movable micro-mirrors 120. Electrodes 170 act on the micro-mirror 122 and mounting arm 125 to control the angular position of the micro-mirror 122 by electrostatic or electromagnetic force.

Figure 5:
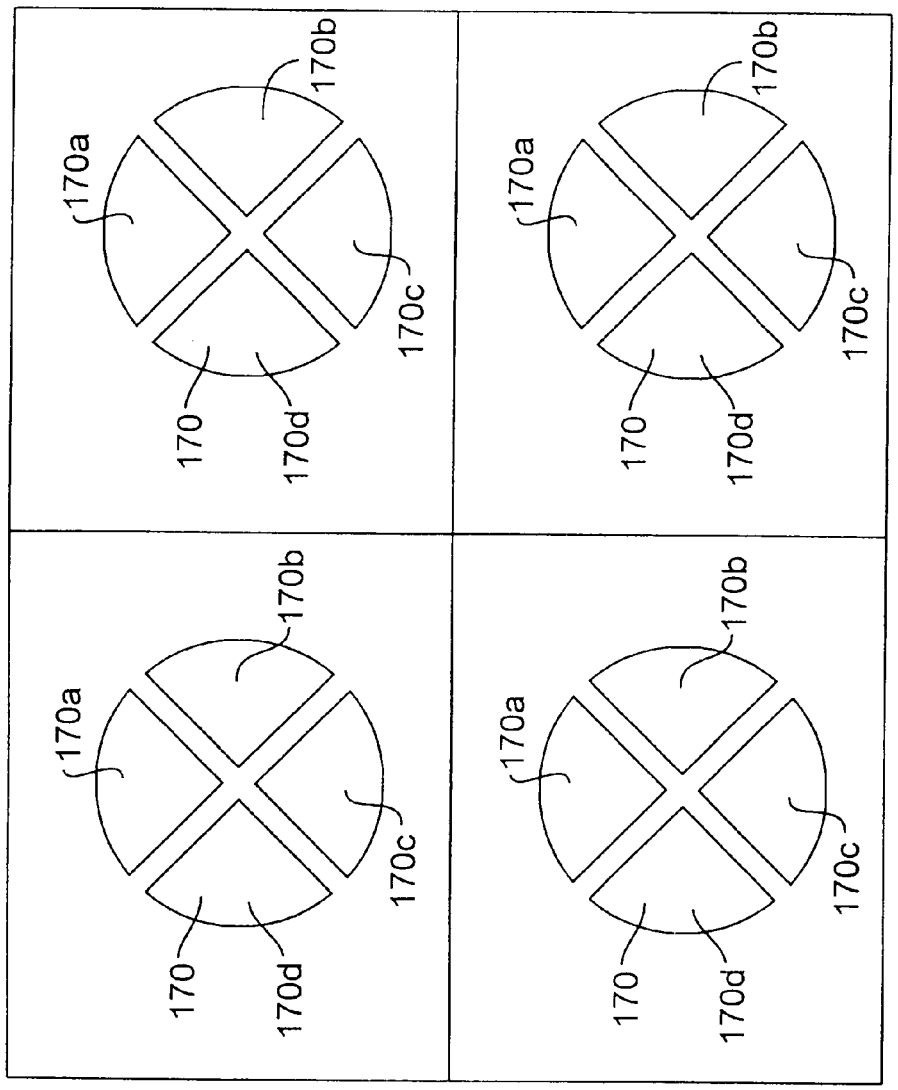
FIG. 5 is plan view of the electrodes in a microelectromechanical ("MEMS") mirror used for controlling the mirror.

FIG. 5 illustrates an exemplary embodiment of electrodes that may be used to control the position of micro-mirrors 122. Similar to FIGS. 4a and 4b, FIG. 5 is merely an example of an electrode structure that can be used. As shown in FIG. 5, the electrodes 170a and 170c control the angular position of the micro-mirror 122 about axis 126. Electrodes 170b and 170d control the angular position of the micro-mirror 122 about axis 127. As further depicted in FIG. 4B, by appropriate control of electrodes 170a–170d collectively, the tilt angle of micro-mirror 122 may be controlled, as well as, the height 128 (i.e. z-axis) of the mirror 122. A DC bias to all four electrodes 170a–170d can make the top surface of the mirror 122 rise slightly above or sink slightly below the top surface of the submount 110, depending on the polarity of the DC biasing.

An appropriate static DC potential to each of the control electrodes of a micro-mirror can tilt the micro-mirror to a predetermined tilt angle position. The static DC potential can be applied by a controller that specifically controls the predetermined tilt angle, as well as, the height of the micro-mirrors. Subsequent control signals for steering the micro-mirror can then be superimposed on the static DC potential for steering the mirror from the predetermined tilt angle position. However, a single controller with logic circuits can be used that initially directs the mirror with a predetermined tilt angle and/or height. From the predetermined tilt angle, the single controller adjusts the mirror with the appropriate DC biases for moving the micro-mirror and maintaining the a certain height if required.

The single gimbal mechanism, which has two sets of pivot arms as shown in FIGS. 4a, is typically capable of reliably and accurately tilting the micro-mirrors to an angle below a critical angle with respect to the substrate 150. Although the mechanism will herein after be referred to as a single gimbal mechanism, this is only meant to imply the pivot action and does not preclude the pivot arms from also having elasticity in an up and down direction or from side to side. The critical angle at which a micro-mirror should not be tilted past is not only a function of physical limitations of the pivot arms, but also whether the control of the micro-mirror is sufficiently stable switching purposes. As a micro-mirror 122 tilts, an edge of the micro-mirror gets closer in proximity to the control electrodes 170a–170d on the substrate 150. Due to increasingly nonlinear electrostatic forces being exerted on the micro-mirror 122 as the edge of the micro-mirror 122 gets closer to the electrodes, stable control of a micro-mirror 122 becomes more difficult. Therefore, the critical tilt angle for a micro-mirror is the largest tilt that does not cause damage to a micro-mirror's movement mechanism and still enables stable enough control for switching purposes.

The switching tilt angle $\theta$ of a micro-mirror system is the largest angle that any single micro-mirror moves from an initial position in which no electrical control signals are applied to the mirror. The switching tilt angle $\theta$ of a micro-mirror system generally should not be greater than the critical tilt angle of any micro-mirror in the system. The reliability of a micro-mirror system may be improved with every degree that the switching tilt angle $\theta$ of a micro-mirror system is reduced below the critical tilt angle of the micro-mirrors in the system. Another reliability, as well as, precision enhancement is to limit the overall amount of micro-mirror travel $\Omega$ in terms of the angle that micro-mirror travels while switching. Of course, the angle of the overall amount of mirror travel $\Omega$ is no greater than twice the switching tilt angle $\theta$.

Figure 6:
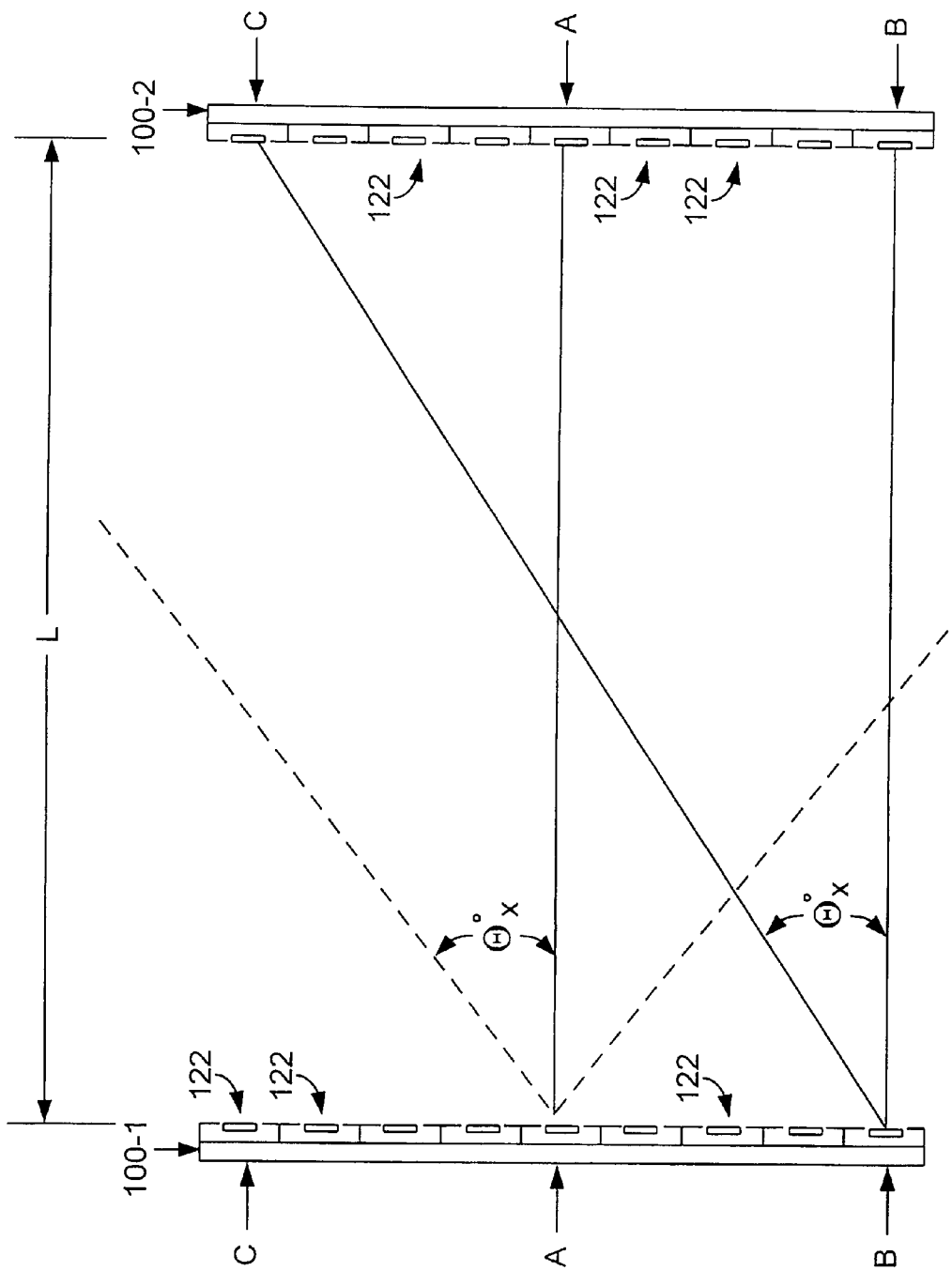
FIG. 6 illustrates the relation of the distance between two planar arrays of mirrors and the system tilt angle θ.

For explanation purposes, FIG. 6 is representational showing of how the distance between two planar micro-mirror arrays 100 is affected by the switching tilt angle $\theta$ of the micro-mirrors. The illustration in FIG. 6 is in terms of micro-mirrors 122 in one array 100-1 interacting with micro-mirrors 122 in the other array 100-2 to reflect light beams from an input to an output in a cross-sectional view down the I/O plane. The I/O plane is a plane that generally contains the beams 36/37/38 of the optical path as shown in FIG. 3. For reference purposes, the I/O plane may be seen as containing the y component of an array's orientation and thus the other two-dimensional normals components of z and x can be determined, as shown in FIG. 3. Therefore the cross-sectional view shown in FIG. 6 is the view looking straight down on top of the "Z-shaped" optical path along the y-axis, as discussed with regard to FIG. 3, and parallel to the planar orientation of the arrays.

As shown in FIG. 6, micro-mirror arrays 100 may have a micro-mirror at position A in the middle of each of the arrays 100 and a micro-mirror at positions B and C on sides of the arrays 100. Preferably, every micro-mirror on an array 100-1 can interact with every micro-mirror on the other array 100-2. The distance L between the two arrays affects the length of the optical path through the optical switching device in that a shorter distance L will reduce the length of the optical path. Assuming each micro-mirror 122 of an array 100-1 is capable of directing an input beam to any micro-mirror 122 of array 100-2, the minimum distance L that can be obtained depends upon the switching tilt angle $\theta_x$ used for the micro-mirrors in the switching process. Specifically, the minimum distance L is depends upon the switching tilt angle $\theta_x$ in that a micro-mirror at position B of the first array 100-1 is able to interact with a micro-mirror at position C of the second array 100-2. Although the switching tilt angle $\theta_x$ allows a micro-mirror at position A of array 100-1 to interact with all the micro-mirrors of array 100-2 at distance that is about half the distance L shown, the micro-mirror at position B of array 100-1 is at the switching tilt angle $\theta_x$ when interacts with the micro-mirror at position C of array 100-2 and thus requires a distance between the arrays of at least the distance L, as shown in FIG. 6. Of course, the distance L can be further decreased below the minimum distance L for every micro-mirror 122 on array 100-1 interacting with every micro-mirror 122 on array 100-2 by predetermining that specific groups of micro-mirrors 122 on array 100-1 only have to interact with specific groups of micro-mirrors 122 on array 100-2.

Figure 7:
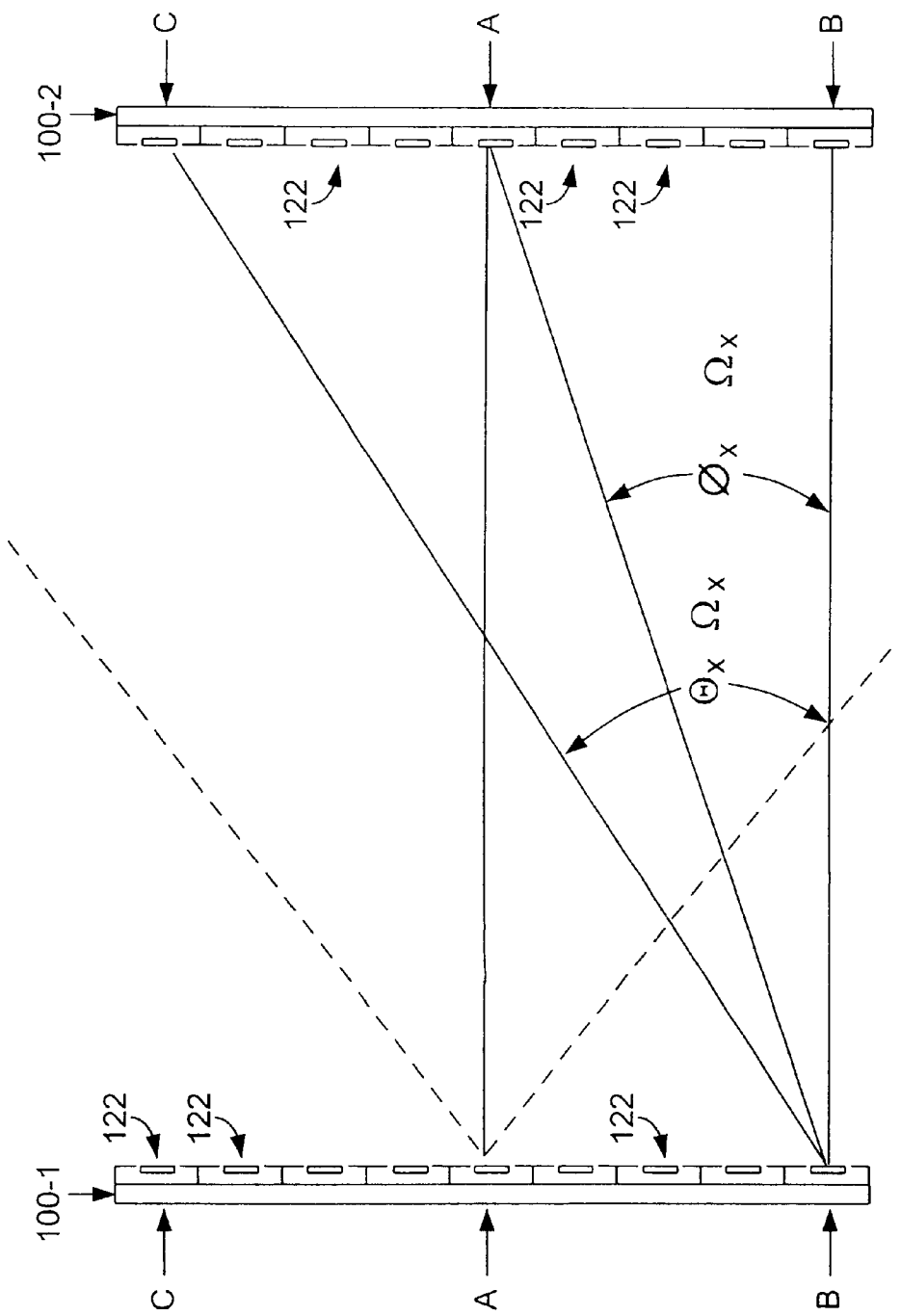
FIG. 7 illustrates the electrical offset angle $\Phi_{xe}$ of and array and the relation of an electrical offset angle $\Phi_{xe}$ to the amount of mirror travel $\Omega_x$.

FIG. 6 also shows that the micro-mirror at position B of the first array 100-1 may have to subtend an angle as large as $\theta_x$ and thus the overall amount of micro-mirror travel $\Omega_x$ will be equivalent to $\theta_x$. When micro-mirrors move over large ranges, they tend to gain speed and thus momentum. Therefore, stopping the micro-mirrors after they have moved over large range is difficult in terms of precisely stopping the micro-mirror at the correct position and may even require dampening to counteract residual vibrations from such a large movement. However, as shown in FIG. 7, the overall amount of micro-mirror travel $\Omega_x$ that the micro-mirror at position B of array 100-1 can be reduced to $\Omega_{ex}$ by applying an appropriate static DC bias to the control electrodes 170a–170d, as shown in FIG. 5, so as to tilt the micro-mirror at position B of array 100-1 to aim at position A (i.e. the middle) of array 100-2. The electrical offset angle $\Phi_{xe}$ of a micro-mirror, which results from the appropriate static DC bias on the control electrodes, is the tilt of the micro-mirror with respect to a normal to the surface of the substrate 150 surface directly under the micro-mirror.

Any subsequent signals applied to the electrodes 1701–170d to control the electrical offset angled $\Phi_e$ micro-mirror at position B in the first array 100-1 for switching purposes are superimposed on the static DC bias already applied to the control electrodes 170a–170d. As result of the electrical offset angle $\Phi_{ex}$, the micro-mirror at position B of the first array 100-1 will have an angle of micro-mirror travel $\Omega_{ex}$ no greater than $\theta_x/2$. Therefore, there is less overall movement of the micro-mirrors in terms of the angle subtended by the micro-mirror when the micro-mirror moves from an electrical offset angle $\Phi_e$ that initially aims a micro-mirror toward the center of the other micro-mirror array in which it interacts.

Micro-mirrors having smaller angles of micro-mirror travel $\Omega$, as result of an electrical offset angle $\Phi_e$, allow for the micro-mirrors to be moved more precisely and reduces the need for dampening. Although FIG. 7 shows an example of an electrical offset angle $\Phi_e$ for aiming micro-mirrors of one array toward the middle of another arrays, like improvements arise if electrical offset angles $\Phi_e$ are made for a predetermined grouping of micro-mirrors on one array with respect to any other predetermined grouping of micro-mirrors on another array. Furthermore, electrical offset angles $\Phi_e$ can be used on all or on some of the micro-mirrors in an array. Each respective micro-mirror in an array does not necessarily have to have the same electrical offset angle $\Phi_e$ as each respective opposing micro-mirror in the other array. In general, both reliability and precision of control are enhanced when micro-mirrors are electrical offset angled $\Phi_e$ to operate near the middle of the range in which they operate and reduce the angle of micro-mirror travel $\Omega$.

Figure 8:
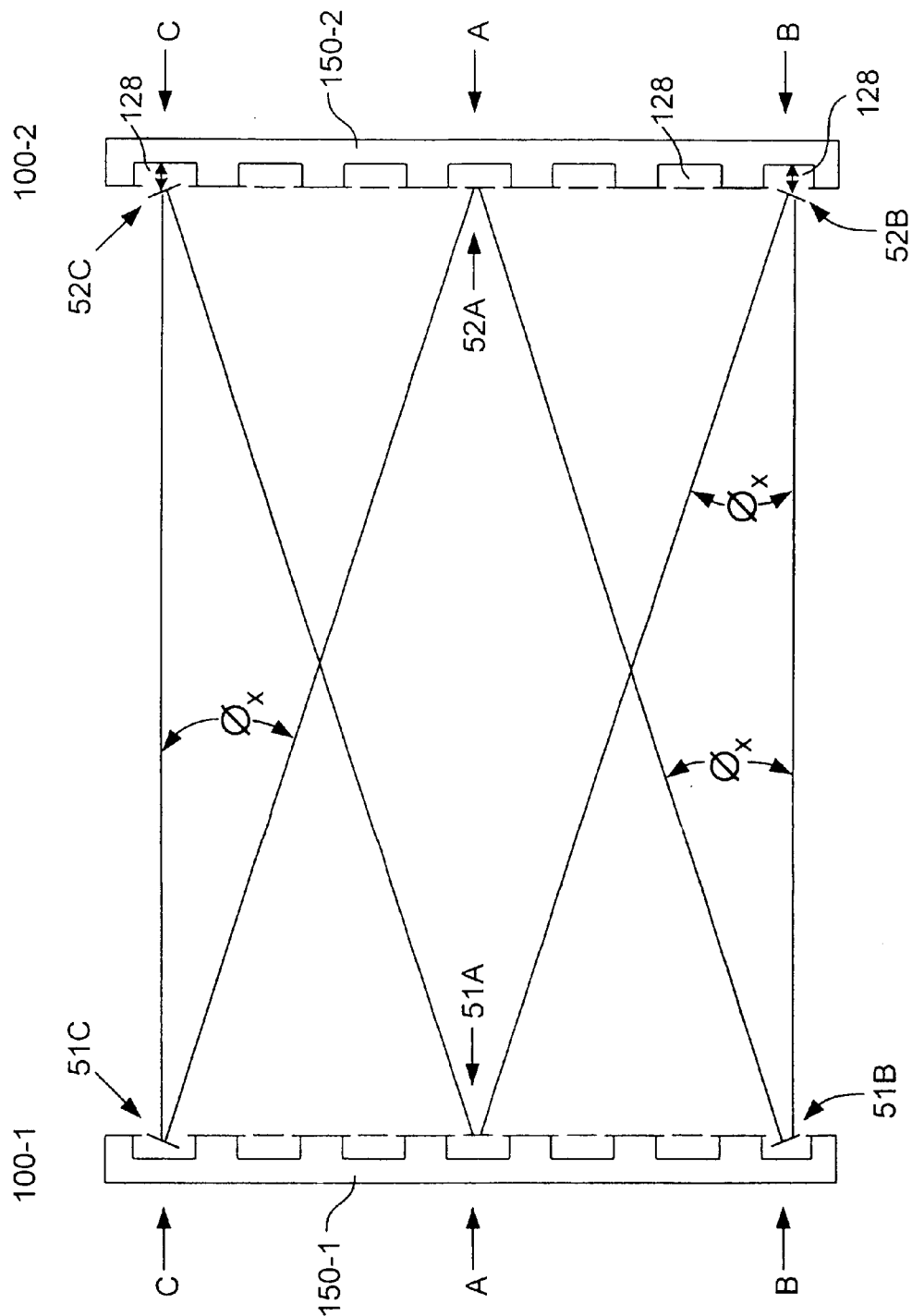
FIG. 8 illustrates embodiments of the invention using an electrical offset angle to reduce the amount of mirror travel $\Omega_x$ and to reduce the optical path.

FIG. 8 shows the micro-mirrors 51B and 51C at positions B and C of array 100-1 electrical offset angled $\Phi_{xe}$ so as to be initially aimed at position A of the second array 100-2 before any subsequent control signals are applied to the control electrodes 170a–170d of the micro-mirror 51B and 51C of array 100-1. As shown in FIG. 8, the electrical offset angle $\Phi_{xe}$ is measured from a normal to the plane surface of the arrays in cross-sectional view down the I/O plane. Of course, an electrical offset angle $\Phi_{ye}$ component can also be measured with respect to normal of the plane surface of the array in a normal view to the I/O inputs.

As per the discussion with regard to FIG. 4b, an electrical offset angled $\Phi_e$ micro-mirror cannot only be tilted but the height of micro-mirror relative to the substrate 150 can be increased. In effect, the micro-mirrors on one array can be moved closer to the micro-mirrors on the other array. Therefore, the optical path between the micro-mirrors on one array and the micro-mirrors on the other array is shortened as the micro-mirrors on each respective array move closer to one another as result of an electrical offset angle $\Phi_e$.

FIG. 8 also illustrates another exemplary embodiment of the invention in which the micro-mirrors 52B and 52C near the periphery of array 100-2 are electrical offset angled $\Phi_{xe}$ toward the middle of array 100-1 near the position of micro-mirror 51 A in array 100-1, as well as, the height 128 of the micro-mirrors 52B and 52C being increased so that the optical path can be shortened. The increased height of these mirrors increases the value of the critical angle for these micro-mirrors since the micro-mirror can subtend a larger angle without being subject to increasingly nonlinear electrostatic effects that make the micro-mirror unstable for switching purposes.

Figure 9:
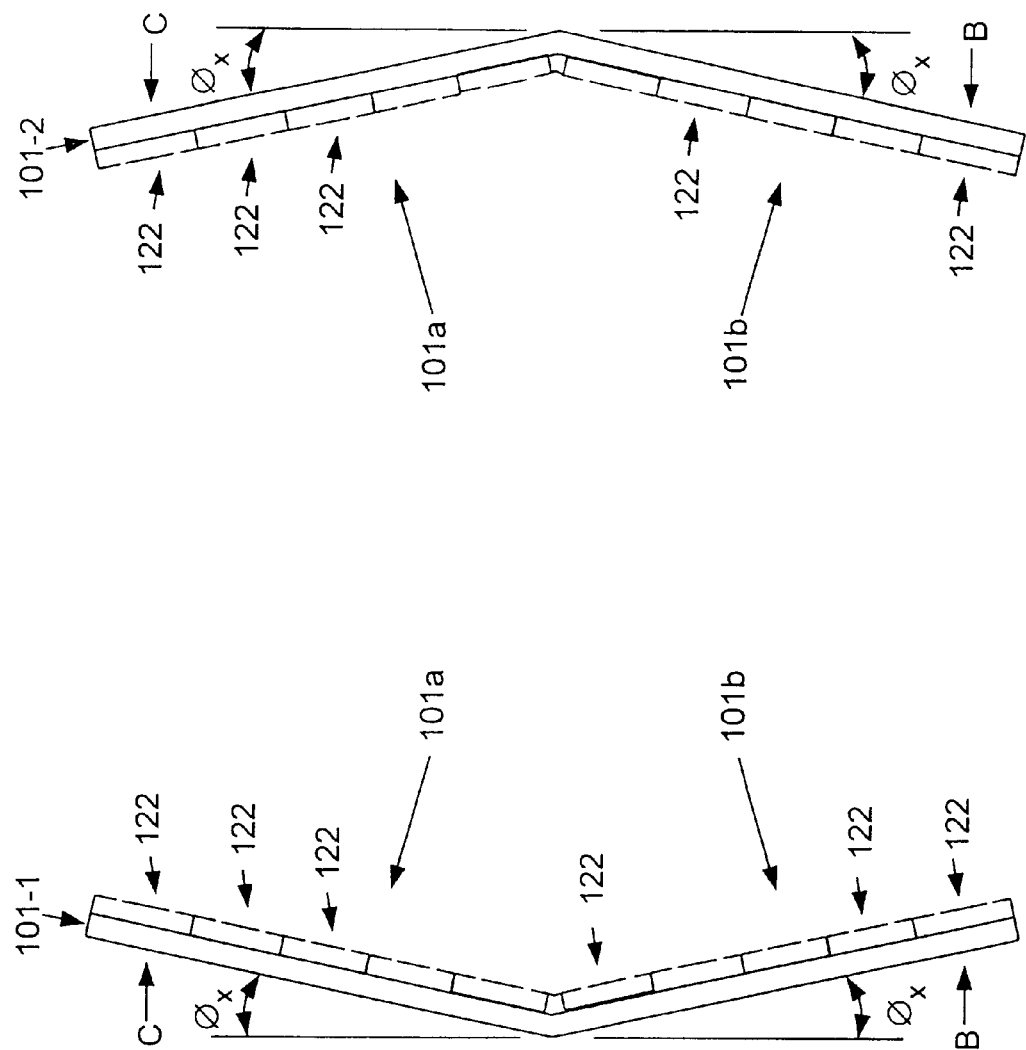
FIG. 9 illustrates the geometric offset angle $\Phi_{xg}$ of a mirror array.

Another embodiment of the invention for reducing optical losses and mirror travel in an optical switch is shown in FIG. 9. The micro-mirrors 122 of nonplanar arrays 101-1 and 101-2 are geometric offset angled $\Phi_{xg}$ by forming both of the micro-mirror arrays in a nonplanar manner so as to aim the micro-mirrors of one array more toward the center of the other array. As shown in the embodiment of FIG. 9, arrays 101-1 and 101-2 are comprised of a segment 101a and segment 101b that are inclined at an angle $\Phi_{xg}$ from a normal to the I/O plane. The geometric offset angle also has a $\Phi_{yg}$ component which is within the I/O plane and normal to the $\Phi_{xg}$ component.

Figure 10:
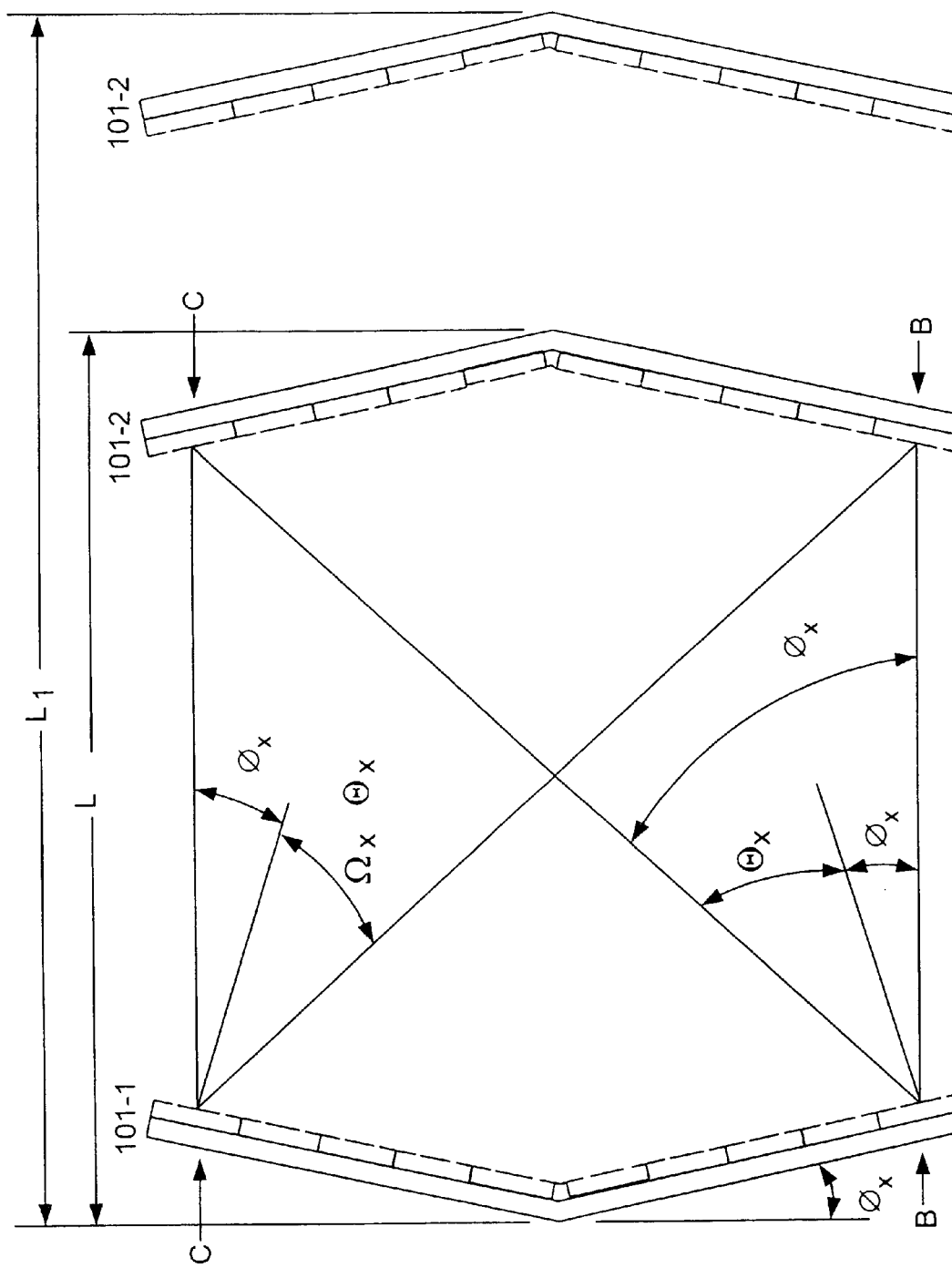
FIG. 10 illustrates the increase effective switching angle as result of a geometric offset angle $\Phi$ and reducing the distance between mirror arrays to shorten the optical path.

Assuming that each micro-mirror 122 of a first geometric offset angled array 101-1 is capable of directing an input beam to any micro-mirror 122 of a second geometric offset angled array 101-2, FIG. 10 illustrates how the first geometric offset angled array 101-1 and the second geometric offset angled array 101-2 increases the effective switching angle $\delta$ of the system and thus the distance L between the arrays can be reduced to distance $L_g$ as a result of a geometric offset angle. The micro-mirror array 101-2'at position I represents a geometric offset angled array at distance $L_p$ from the micro-mirror array 101-1 in which the distance $L_p$ would be the minimum distance of separation necessary if the two arrays 101 were both planar. Of course, the distance can be further decreased below the distance $L_g$ if it is not required that every micro-mirror 122 on array 101-1 has to interact with every micro-mirror 122 on array 101-2.

Given that all micro-mirrors on both arrays have to interact with one another, the effective switching angle $\delta$ of the system is equivalent to the micro-mirror's switching tilt angle $\theta_x$ plus the geometric offset angle $\Phi_{xg}$ as shown in FIG. 10 at position B of array 101-1. Because of the increased effective switching angle 6 afforded to micro-mirrors at position B and C of the array 101-1, the second array 101-2 can be in the position II as depicted in FIG. 10 and thus have a reduced length of $L_g$ between the two arrays 101. However, the second array can be placed at a location between position I and position II to both decrease the distance below $L_p$ and decrease the switching angle δ of the system as well. The decrease in the switching angle δ of the system in this instance would increase the reliability of the micro-mirrors by allowing a reduction of the switching tilt angle θ for micro-mirrors near the periphery of the arrays. Because, as shown in FIG. 10 at position C of array 101-1, reducing the switching tilt angle θ of micro-mirrors near the periphery of the arrays would be reducing the amount of micro-mirror travel nΩ for these micro-mirrors.

Therefore, by using a geometric offset angle $\Phi_g$, an optical switch using micro-mirrors can have an increased effective switching tilt angle δ that is greater than the switching tilt angle θ used in the micro-mirrors arrays. An increased switching tilt angle θ can allow for shorter distances between arrays and can also allow for a further reduction of the switching tilt angle θ of the system below the critical tilt angle of the micro-mirrors to increase the reliability of the optical switching system. Furthermore, the geometric offset angle $\Phi_g$ may provide a reduction in the amount of micro-mirror travel Ω in terms of the angle that micro-mirror travels for switching, which further enhances the precision of control and reduces the need for dampening.

Figure 11:
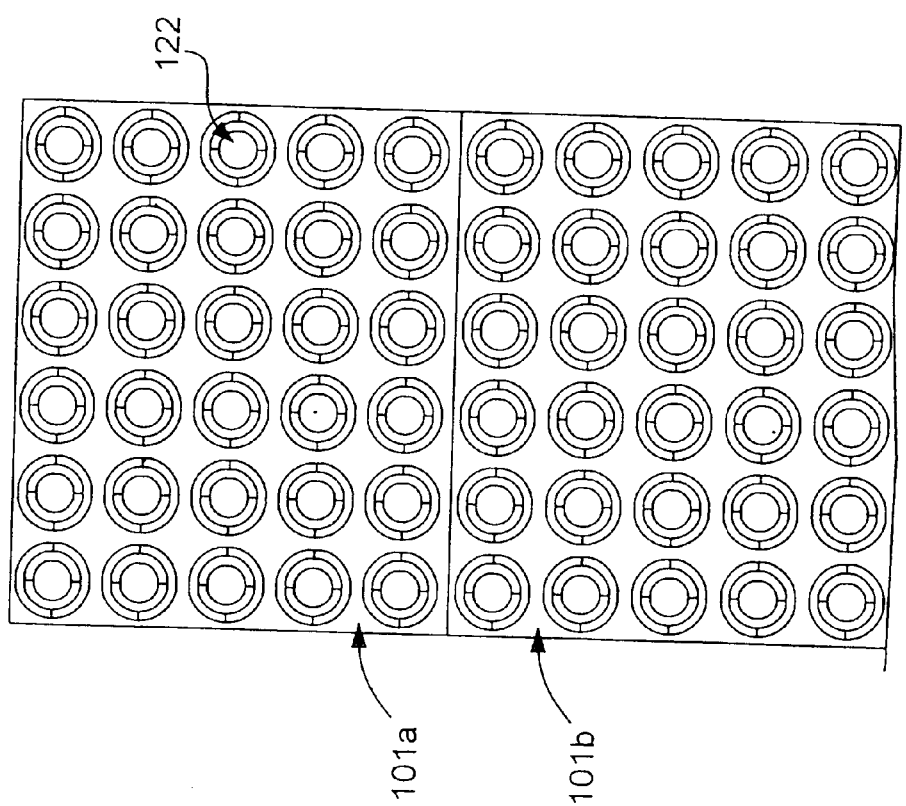
FIG. 11 illustrates a plan view of an embodiment of the invention in which a rectangular array has a geometric offset angle $\Phi_g$ in one dimension and two segments.

The geometric offset angle embodiment shown in FIGS. 9 and 10 of array 101 are cross-sectional views of the array 101. FIG. 11 shows a plan view of rectangular array 101 with square segments 101a and 101b. A plurality of single gimbal micro-mirrors 122 are arranged in rows and columns on each segment. The geometric offset angle shown in FIG. 11 is only with respect to one axes. However, an array may not have consistent or symmetric rows and columns of micro-mirrors and preferably is geometric offset angled with respect to two axes. Furthermore, the array can be a square and the segments do not necessarily have to be square.

Figure 12:
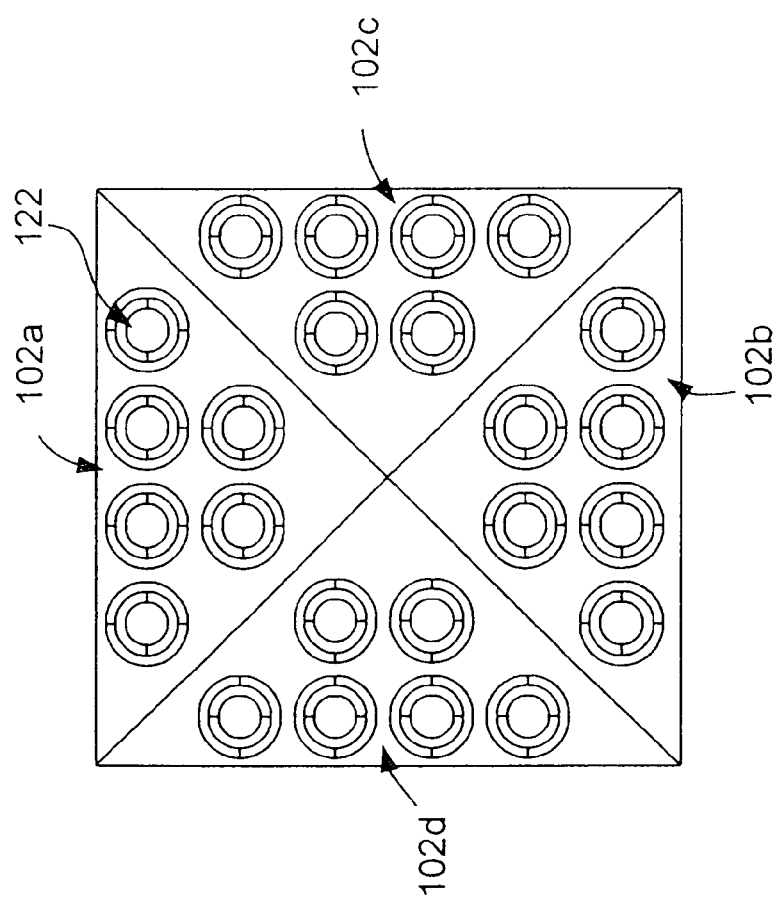
FIG. 12 illustrate a plan view of an embodiment of the invention in which a square array of mirrors has a geometric offset angle $\Phi_g$ in two dimensions and four segments.

As shown in the plan view of another embodiment of the invention in FIG. 12, a square array 102 with the single gimbal micro-mirrors 122 are not arranged in consistent rows and columns. Array 102 has a geometric offset angle with respect to two axes by having four triangular shaped segments 102a–102d with the apexes of the triangular shaped segments meeting in the middle of the array. In effect, the array is an inverted pyramid with the segments 102a–102d sloping down toward the center with the sides of the segments 102a–102d bordering each other forming a valley.

Figure 13A:
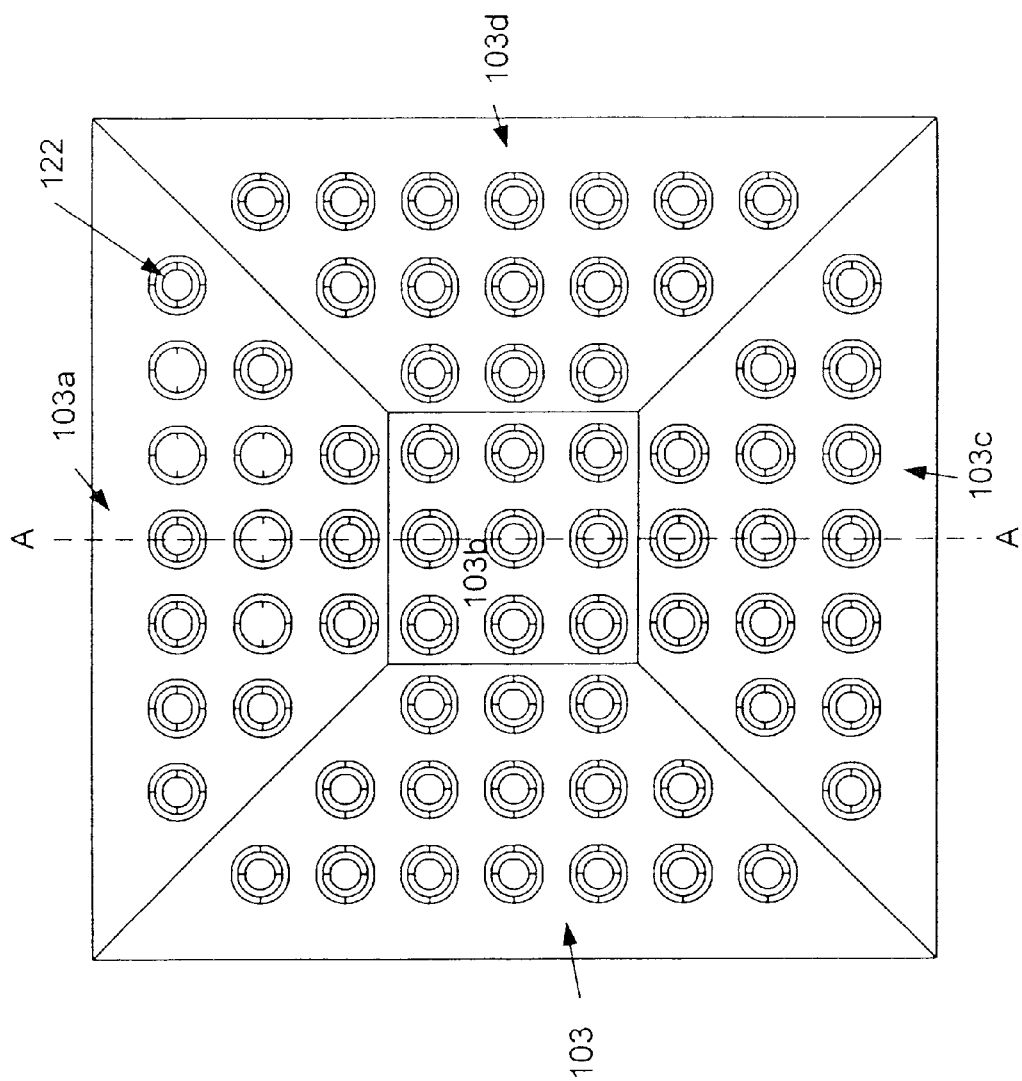
FIGS. 13a and 13b respectively illustrate plan and cross-sectional views of another embodiment of the invention with a geometric offset angle $\Phi_g$ in an array with five segments.
Figure 13B:
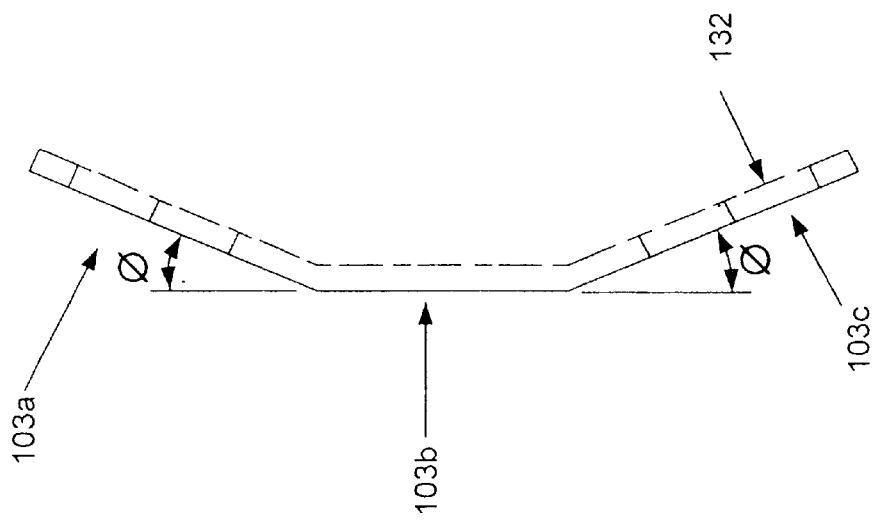

FIGS. 13a and 13b respectively illustrate plan and cross-sectional views of a geometric offset angled $\Phi_g$ array 103 having five segments 103a –103e. FIG. 13b is a cross-section of FIG. 13a along the axis A—A. As shown in FIG. 13a, the array includes a square middle segment 103b of single gimbal micro-mirrors 122 with the short edge of four trapezoidal shaped segments 103a/103c/103d/103e of single gimbal micro-mirrors bordering the four sides of the square middle segment 103b. As shown in FIGS. 13b, the trapezoidal shaped segments 103a and 103c (as well as, 103e and 103d not shown) border the square shaped segment 103b at an angle equivalent to the geometric offset angle $\Phi_g$. FIGS. 13a and 13b illustrate that the segments of a geometric offset angled array do not necessarily have to be the same shape or size. The segments can be elliptical, circular, square, rectangular, polygons, polygonal with curved sides or the segments can be curved. Furthermore, the segments are not limited to any particular arrangement of micro-mirrors that can be on the segments. In fact, a geometric offset angled array may have a segment that does not have a micro-mirror.

Figure 14A:
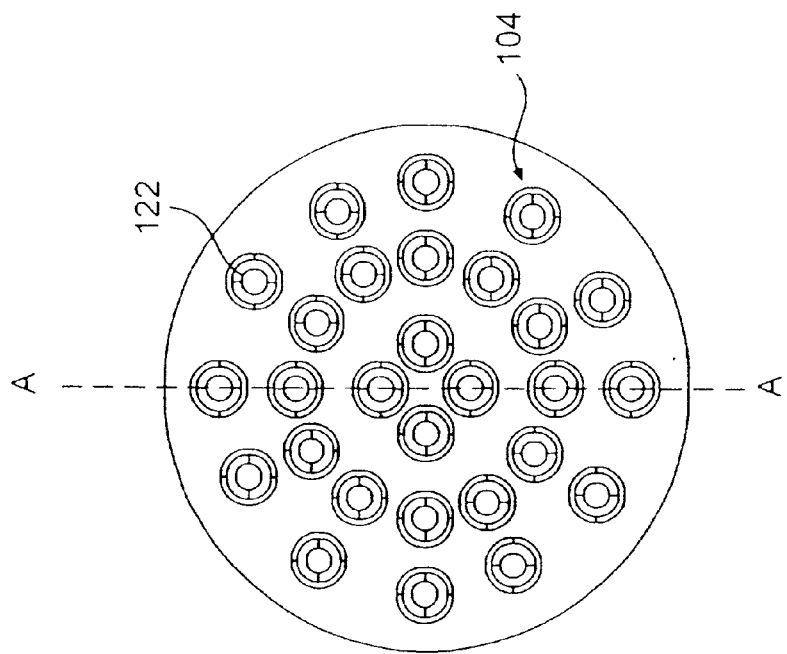
FIGS. 14a and 14b respectively illustrate plan and cross-sectional and plan views of another embodiment of the invention with a geometric offset angle $\Phi_g$ in a curved array.
Figure 14B:
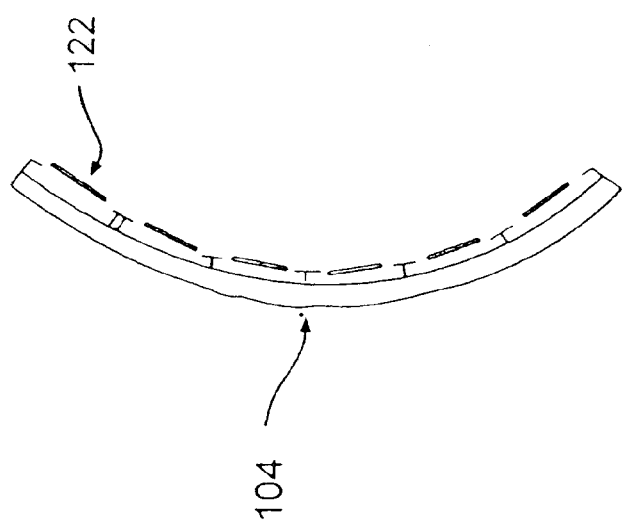

FIGS. 14a and 14b respectively illustrate plan and cross-sectional views of a geometric offset angle circular-shaped array 104. FIG. 14b is a cross-section of FIG. 14a along the axis A—A. The array 104 consists of a curved shape array 104 of single gimbal micro-mirrors. As shown in FIGS. 14a and 14b, a geometric offset angled array does not necessarily have to be rectangular nor do the segments of the array have to be flat. The number, size and shapes of the segments for a geometric offset angled array are not limited.

Figure 15A:
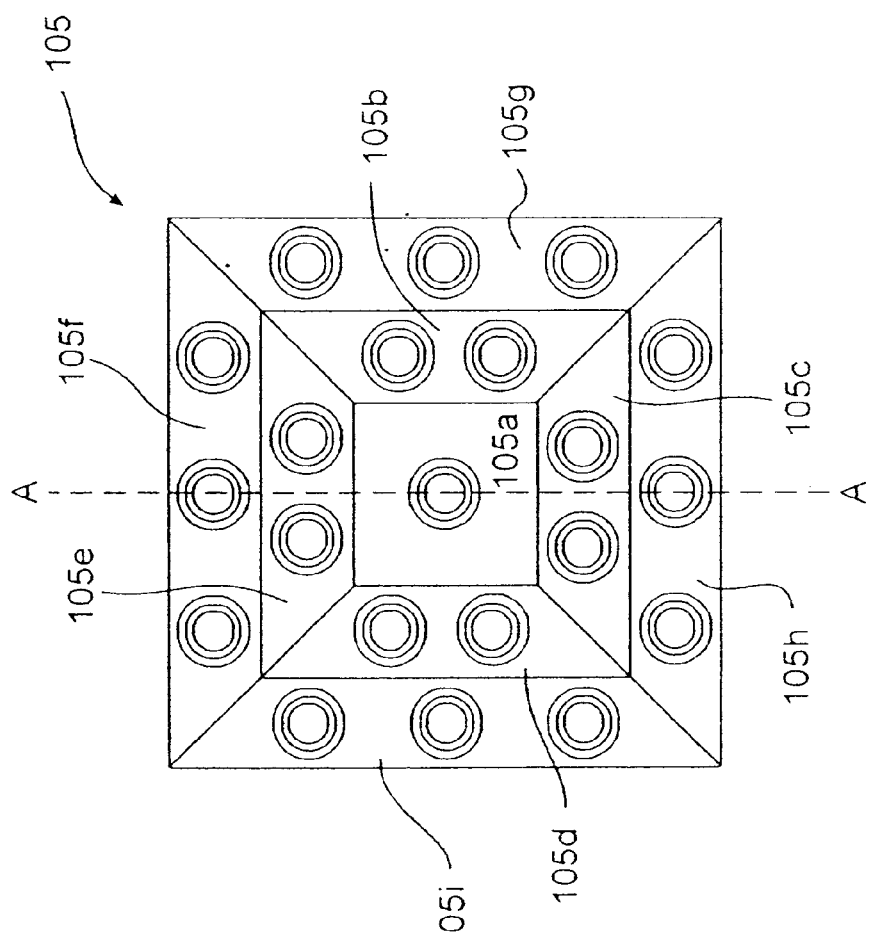
FIGS. 15a and 15b respectively illustrate plan and cross-sectional views of another embodiment of the invention with two geometric offset angles $\Phi_g$ in an array with nine segments.
Figure 15B:
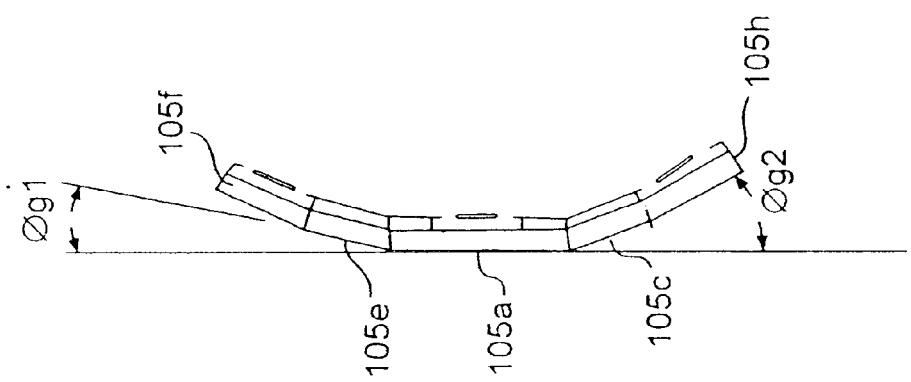

FIGS. 15a and 15b respectively illustrate plan and cross-sectional views of a geometric offset angled $_g$ array 105 having nine segments 105a–105i. FIG. 15b is a cross-section of FIG. 15a along the axis A—A. The array has two sets of four segments as a result of having two geometric offset angles $\Phi_{g1}$ and $\Phi_{g2}$. As shown in FIG. 15a, the array consists of a square middle segment 105a of single gimbal micro-mirror 122 with the short edge of a first set of four trapezoidal shaped segments 105b/105c/105d/105e of single gimbal micro-mirrors and a second set of four trapezoidal shaped segments 105f/105g/105h/105i of single gimbal micro-mirrors bordering the four sides of the first set of trapezoidal segments 105b/105c/105d/105e. As shown in FIGS. 13b, the trapezoidal shaped segments 105c and 105e (as well as, 105b and 105d not shown) border the square shaped segment 105a at an angle equivalent to the geometric offset angle $\Phi_{g1}$. The trapezoidal shaped segments 105f and 105h (as well as, 105g and 105i not shown) border the first set of four trapezoidal shaped segments 105b/105c/105d/105e and have a geometric offset angle $\Phi_{g2}$. FIGS. 15a and 15b illustrate that more than one geometric offset angle can be used in an array.

Figure 16B:
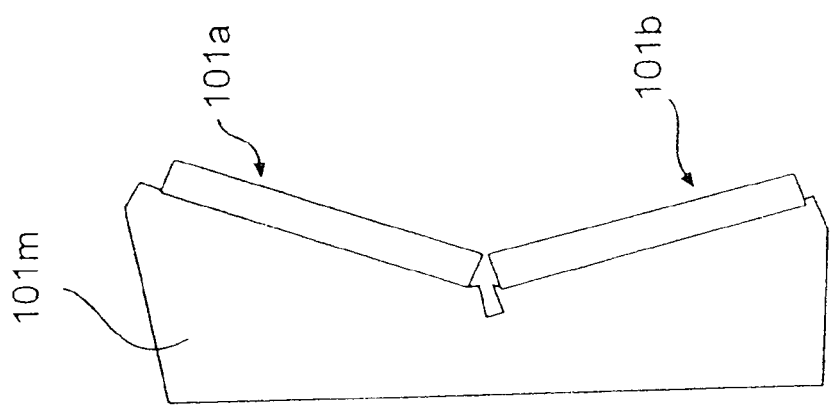

The arrays with a geometric offset angle can be formed, for example, on a single substrate, on bonded substrates or on several substrates attached to a mount. For example, each segment 101a and 101b of the array shown in FIG. 9, can be formed on their own substrate. Each of the substrates can either be bonded to one another, as shown in FIG. 16a, or attached to a mount 101m, as shown in FIG. 16b, in order to form the array of micro-mirrors into the desired geometric shape. The mount may also be a frame. The frame may be adjustable in that allows movement for adjusting segments within: an array or adjusting arrays with respect to one another. Furthermore, the arrays may be on individual dies mounted on separate die carriers and then those carriers can be arranged in the geometries described herein.

Although the optical switching system shown in FIG. 10 is shown to be using the same two nonplanar arrays, a system may use a planar array with a nonplanar array. Furthermore, optical switching systems using nonplanar arrays do not have to use the same nonplanar shape for each nonplanar array. Preferably, arrays in an optical switching system should have the same shape to simplify control in steering of the micro-mirrors. In addition, an electrical offset angle can be used on some or all of the micro-mirrors in a geometrically offset angled array to enhance reliability, control of the micro-mirrors and further shorten the optical path.

Figure 17:
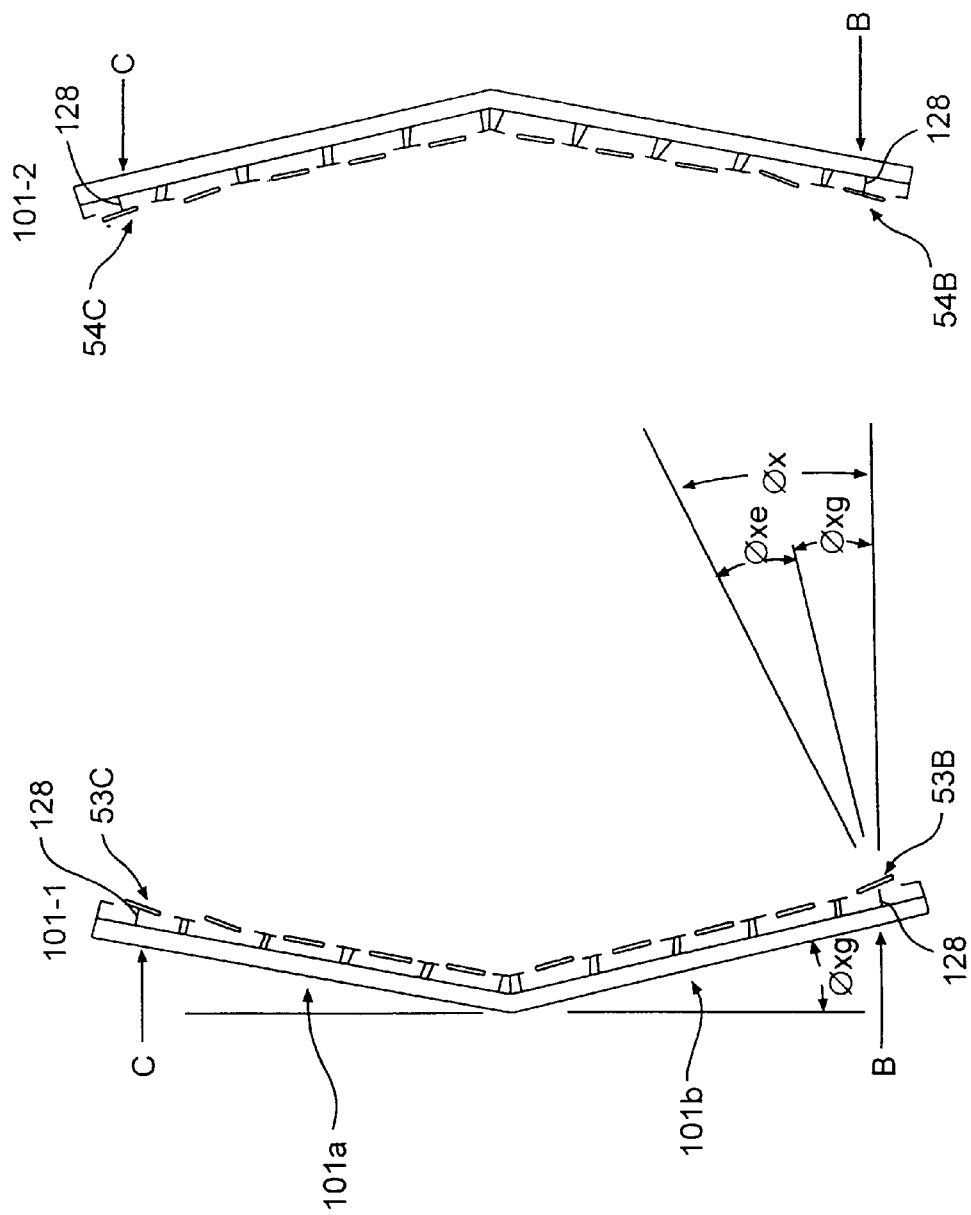
FIG. 17 illustrates an offset angle $\Phi$ as a result of both a geometric and an electrical offset angle $\Phi$.

As shown in FIG. 7, an electrical offset angle $\Phi_e$ for a micro-mirror array may be measured relative to the normal of the surface of the substrate on which the micro-mirror is mounted. Nonplanar arrays can have many inclined segments and therefore the normal of the I/O plane of the optical switch and the normal of a line within the I/O plane that intersects the middle of the two interacting arrays may be used as the basis for determining geometric offset angle $\Phi_g$ for a micro-mirror on each segment of a nonplanar array. However, micro-mirrors on nonplanar arrays that are both electrical offset angled $\Phi_e$ and geometrical offset angled $\Phi_g$ have their offset angle measured as the sum of their electrical offset angle $\Phi_e$ and their geometrical offset $\Phi_g$ angle. As shown in FIG. 17, the offset angle $\Phi_x$ for micro-mirror 53B on the 101b segment of array 101-1 is equivalent to the geometric offset angle $\Phi_{xg}$ measured with respect to the normal of the I/O plane of the optical switch plus the electrical offset angle $\Phi_{xe}$ is measured relative to the normal of the surface of the segment 101b on which the micro-mirror 53B is mounted.

FIG. 17 also shows that the micro-mirrors 53B, 53C, 54B and 54C along the periphery, as well as, other micro-mirrors near the periphery of arrays 101-1 and 101-2 can be electrical offset angled $\Phi_e$. Of course, all of the mirrors can be electrical offset angled $\Phi_e$ so as to minimize their micro-mirror travel. Furthermore, as per the discussions with regard to FIGS. 4b and FIG. 8, FIG. 17 also shows that the height 128 of the micro-mirrors 53B, 53C, 54B and 54C near the periphery of geometric offset angled array 101 can be increased so as to shorten the optical path.

Figure 18A:
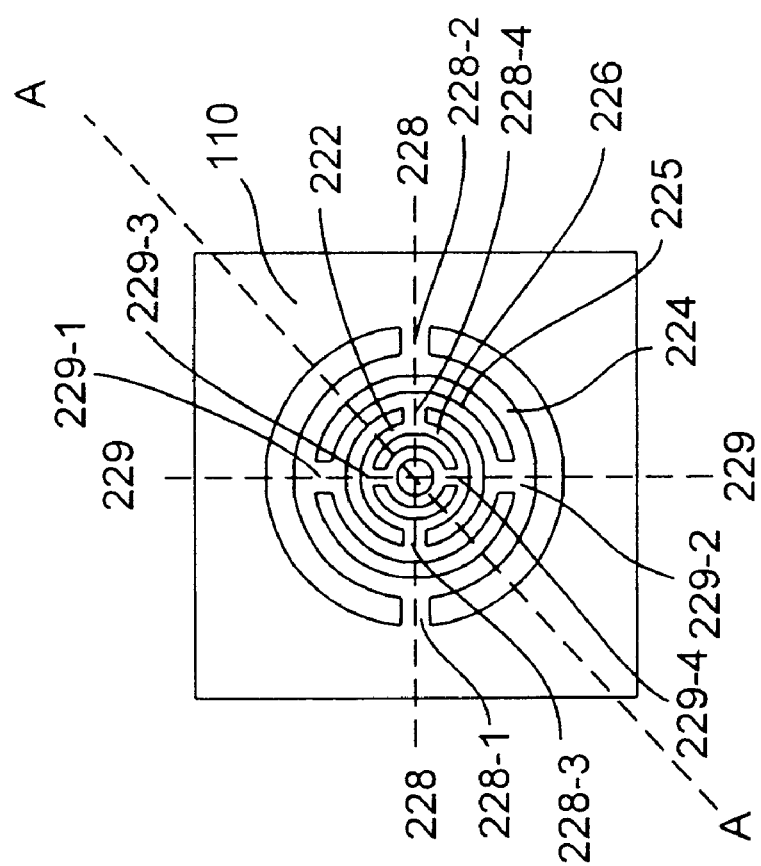
FIGS. 18a and 18b are respectively plan and cross-sectional views of another embodiment using a double gimbal movement mechanism to increasing the critical angle of a MEMS micro-mirror.

Another exemplary embodiment of the invention, as shown in FIG. 18a, is to increase the switching tilt angle θ of the micro-mirrors in an array by adding a third and fourth sets of pivot points to micro-mirror's gimbal mechanism in order to create a double gimbal movement system for the MEMS micro-mirrors. In particular, the double gimbal micro-mirror includes a mirror mount 224 coupled to the remainder of the planar submount 110 by pivot arms 228-1, 228-2 and coupled to the mirror mount 225 by pivot arms 229-1 and 229-2. Mirror mount 225 is also coupled to mirror mount 226 by pivot arms 228-3 and 228-4. Micro-mirror 222 is coupled to mirror mount 226 by pivot arms 229-3 and 229-4. Pivot arms 228-1, 228-2, 228-3 and 228-4 enable the mounting arms 224, 225 and 226, and thus the micro-mirror 222, to pivot with respect to the substrate about a first axis 228. Pivot arms 229-1, 229-2, 229-3 and 229-4 enable the micro-mirror 222 to pivot with respect to the mounting arms 226 and 224 about a second axis 229, which is orthogonal to the first axis 228. However, pivot arms 229-1 and 229-2 may be have different axes than 229-3 and 229-4, and pivot arms 228-1 and 228-2 may have a different axes than 228-3 and 228-4.

Figure 18B:
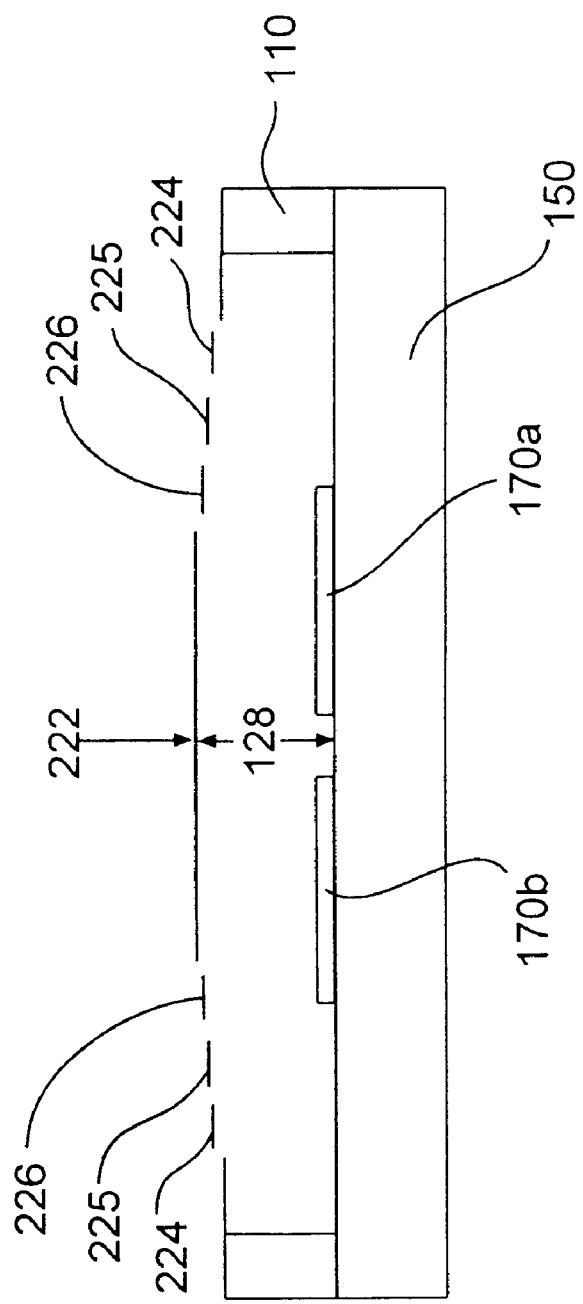

As shown in FIG. 18b, which is the cross-sectional view along line A—A in FIG. 18a, the pivoting action is caused by electrostatic or electromagnetic forces on the mirror 222 from electrodes 170 on the substrate 150. A single gimbal movement mechanism has only one mirror mount 224 as shown in FIG. 18a. A double gimbal movement mechanism has two additional mirror mounts 225 and 226. The additional mirror mounts with their additional third and fourth sets of pivot arms increases the critical tilt angle of the micro-mirrors and thus allows an increase in the switching tilt angle θ capability of the micro-mirrors by about 100 percent. The addition of a third and fourth sets of pivot points also enables the use of DC biasing to control the height 128 that the micro-mirror 222 can obtain with respect to the substrate 150. Adding additional pairs of sets of pivot points cumulatively adds to the critical tilt angle of the micro-mirror. Adding fifth and sixth sets of pivot points, as well as, seventh and eighth sets of pivots are also possible.

Figure 19:
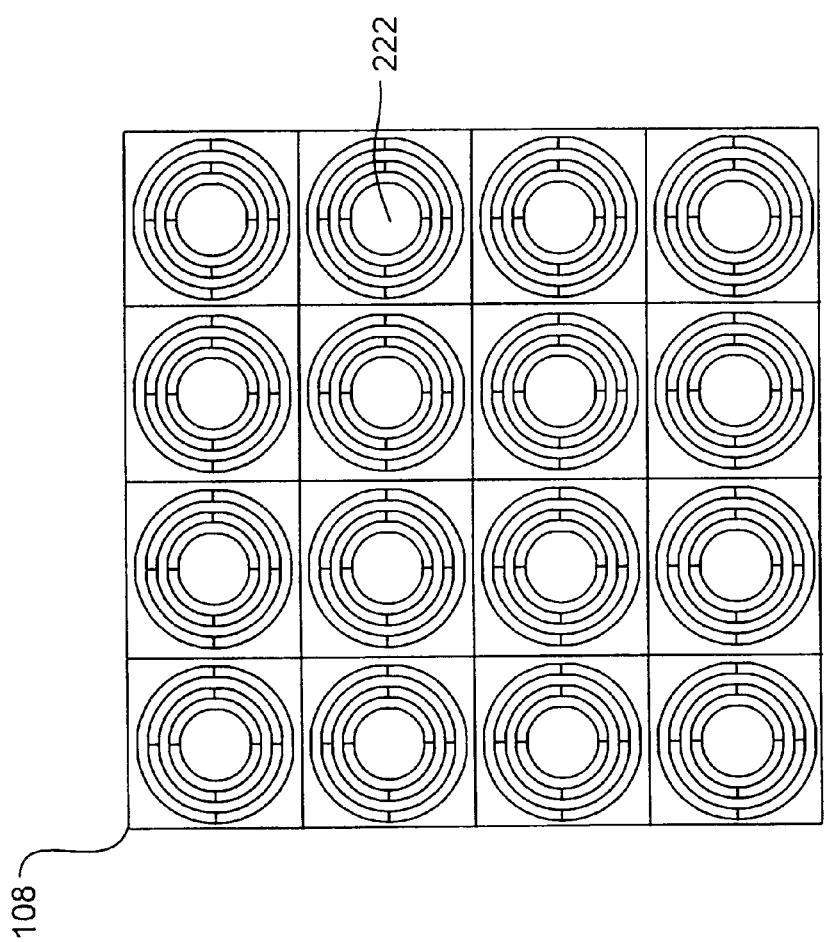
FIG. 19 is an exemplary embodiment of an array of micro-mirrors having a double gimbal movement mechanism.

The increased switching tilt angle θ and increased height capability of a double gimbal movement mechanism increases the flexibility of using an electrical offset angle in a micro-mirror arrays to reduce the distance L, as discussed with regard to FIG. 6. FIG. 19 shows square planar array 108 of double gimbal micro-mirrors 222. Like single gimbal micro-mirrors, all or some of the micro-mirrors, especially on the periphery of the array can be electrical offset angled $\Phi_e$. Micro-mirrors having a double gimbal movement mechanism may not necessarily be needed in the center of an array. Therefore, micro-mirrors having a double gimbal movement mechanism could be used just near the periphery of an array. For example, as shown in FIG. 20, the double gimbal micro-mirrors can be used just on the periphery of a geometric offset angled array $\Phi_g$.

Figure 20:
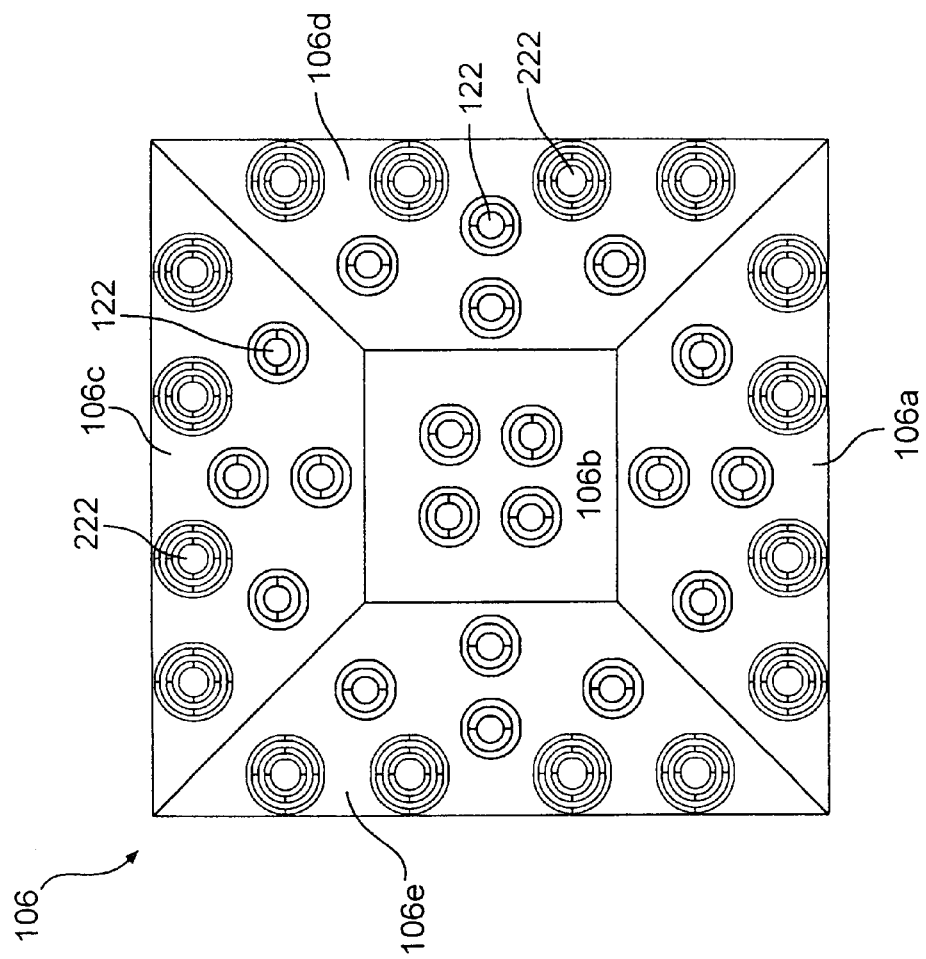
FIG. 20 is an exemplary embodiment of an array of geometric offset angled $\Phi_g$ micro-mirrors of both single and double gimbal movement mechanisms which can also be electrical angled offset $\Phi_e$.

In particular, the array 106 in FIG. 20 consists of a square middle segment 106b having single gimbal micro-mirrors 122 with the short edge of four trapezoidal shaped segments 106a/106c/106d/106e having single gimbal micro-mirrors bordering the four sides of the square middle segment 106b and double gimbal micro-mirrors 222 near the outer edge of trapezoidal-shaped segments 106a/106c/106d/106e. Like the geometric offset angled $\Phi_g$ single gimbal micro-mirror 53B in FIG. 16, the double gimbal micro-mirrors 222 in FIG. 20 can also be electrical offset angled $\Phi_e$. Furthermore, the single gimbal micro-mirrors in the trapezoidal-shaped segments 106a/106c/106d/106e can also be electrical offset angled $\Phi_e$.

It will be apparent to those skilled in the art that various modifications and variations can be made in the optical switch of the present invention without departing from the spirit or scope of the invention. Thus, it is intended that the present invention covers the modifications and variations of this invention provided they come within the scope of the appended claims and their equivalents.

What is claimed is:

1. An optical switch comprising:
   a plurality of optical inputs;
   a plurality of optical outputs;
   an optical switching mechanism for selectively coupling input optical signals from the plurality of optical inputs to the plurality of optical outputs, the optical switching mechanism including an array of at least two steerable mirrors, wherein at least one of the steerable mirrors has an offset angle greater than zero degrees, and said array of mirrors is a nonplanar array and said offset angle comprises a geometric offset angle.

2. The optical switch according to claim 1, wherein the nonplanar array comprises two or more segments on which mirrors are located.

3. The optical switch according to claim 1, wherein the nonplanar array comprises a segment with a curved shape.

4. The optical switch according to claim 1, wherein the nonplanar array comprises segments having at least two different shapes.

5. The optical switch according to claim 1, wherein the nonplanar array comprises a mirror that is electrical offset angled.

6. The optical switch according to claim 1, wherein the nonplanar array has more than one geometric offset angle.

7. A method of switching optical signals, comprising the acts of:
   receiving optical signals via a plurality of inputs;
   inputting the received optical signals into an optical switch;
   switching the received optical signals within the optical switch using at least two mirror arrays; and
   outputting the received optical signals from the optical switch to output optical fibers, wherein at least one of the mirrors in the arrays has an offset angle greater than zero prior to inputting the received optical signals
   wherein the offset angle comprises an electrical offset angle and the electrical offset angle is achieved by applying static DC potentials to control electrodes of a mirror and subsequent control signals for steering the mirror are superimposed on the static DC potential.

8. An optical switch comprising:

a plurality of optical inputs;

a plurality of optical outputs;

an optical switching mechanism for selectively coupling input optical signals from the plurality of optical inputs to the plurality of optical outputs, the optical switching mechanism including an array of at least two steerable mirrors on a substrate; and control electrodes on the substrate for steering the mirrors, wherein static DC potentials are applied to the control electrodes of a mirror and subsequent control signals for steering the micro-mirror are superimposed on the static DC potential.

9. The optical switch according to claim 8, wherein the static DC potentials raise or lower a mirror relative to the substrate.

10. The optical switch according to claim 8, wherein the static DC potentials tilts a mirror relative to the substrate.

* * * * *